United States Patent
Tamura et al.

(10) Patent No.: US 8,451,534 B2
(45) Date of Patent: May 28, 2013

(54) MICROSCOPE SYSTEM AND METHOD FOR CONTROLLING IT

(75) Inventors: Yosuke Tamura, Kawaguchi (JP); Hideaki Endo, Tokyo (JP)

(73) Assignee: Olympus Corporation, Tokyo (JP)

( * ) Notice: Subject to any disclaimer, the term of this patent is extended or adjusted under 35 U.S.C. 154(b) by 408 days.

(21) Appl. No.: 12/821,430

(22) Filed: Jun. 23, 2010

(65) Prior Publication Data

US 2011/0002033 A1 Jan. 6, 2011

(30) Foreign Application Priority Data

Jul. 2, 2009 (JP) ................................ 2009-158157

(51) Int. Cl.
*G02B 21/06* (2006.01)
(52) U.S. Cl.
USPC ............ 359/388; 359/385; 359/386; 359/387
(58) Field of Classification Search
USPC ................................................ 359/368–390
See application file for complete search history.

(56) References Cited

U.S. PATENT DOCUMENTS

| | | | |
|---|---|---|---|
| 4,643,540 A | 2/1987 | Kawasaki et al. | |
| 5,517,353 A | 5/1996 | Ikoh et al. | |
| 5,703,714 A * | 12/1997 | Kojima | 359/368 |
| 5,706,127 A * | 1/1998 | Saito et al. | 359/381 |
| 6,891,669 B2 * | 5/2005 | Yoneyama et al. | 359/385 |
| 2004/0217259 A1 | 11/2004 | Yoneyama et al. | |
| 2007/0139638 A1 | 6/2007 | Wolpert et al. | |
| 2007/0297049 A1 | 12/2007 | Schadwinkel et al. | |

FOREIGN PATENT DOCUMENTS

| | | |
|---|---|---|
| EP | 0 119 857 A1 | 9/1984 |
| JP | 2004-085959 A | 3/2004 |
| JP | 407196182 B2 | 1/2008 |
| WO | WO 2006/042624 A1 | 4/2006 |
| WO | WO 2008/124718 A2 | 10/2008 |

OTHER PUBLICATIONS

Partial European Search Report dated Oct. 22, 2010 (in English) in counterpart European Application No. 10006549.9.
Extended European Search Report (EESR) dated Jan. 25, 2011 (in English) in counterpart European Application No. 10006549.9.
European Office Action dated Aug. 8, 2012 (in English) in counterpart European Application No. 10006549.9.

* cited by examiner

*Primary Examiner* — Thomas K Pham
*Assistant Examiner* — William M Johnson
(74) *Attorney, Agent, or Firm* — Holtz, Holtz, Goodman & Chick, P.C.

(57) ABSTRACT

A microscope system includes: an illumination unit; a light control direction unit specifying quantity of light output from the illumination unit; a storage unit storing voltage-related information in which a direction value specified by the light control direction unit and a voltage value to be applied to the illumination unit are associated with each other and are set, the direction value being in an entire range that can be specified by the light control direction unit under each observation condition, the voltage value corresponding to the direction value; a light quantity control unit controlling the quantity of the emitted light; and a control unit acquiring the voltage value corresponding to the specified direction value from the voltage-related information corresponding to the observation condition, and allowing the light quantity control unit to control the quantity of light based on the acquired voltage value.

5 Claims, 37 Drawing Sheets

100× OBJECTIVE LENS ($I = EXP(\theta)$ [lx])

| NO. | DEGREE $\theta$ [°] | VOLTAGE [mV] | QUANTITY OF LIGHT $I = EXP(\theta)$ [lx] |
|---|---|---|---|
| 1 | 0 | 1.E+01 | 1.E+01 |
| 2 | 15 | 3.E+07 | 3.E+07 |
| 3 | 30 | 1.E+14 | 1.E+14 |
| 4 | 45 | 3.E+20 | 3.E+20 |
| ⋮ | ⋮ | ⋮ | ⋮ |
| ⋮ | ⋮ | ⋮ | ⋮ |
| 22 | 315 | 6.E+137 | 6.E+137 |
| 23 | 330 | 2.E+144 | 2.E+144 |
| 24 | 345 | 7.E+150 | 7.E+150 |
| 25 | 360 | 2.E+157 | 2.E+157 |

FIG. 4

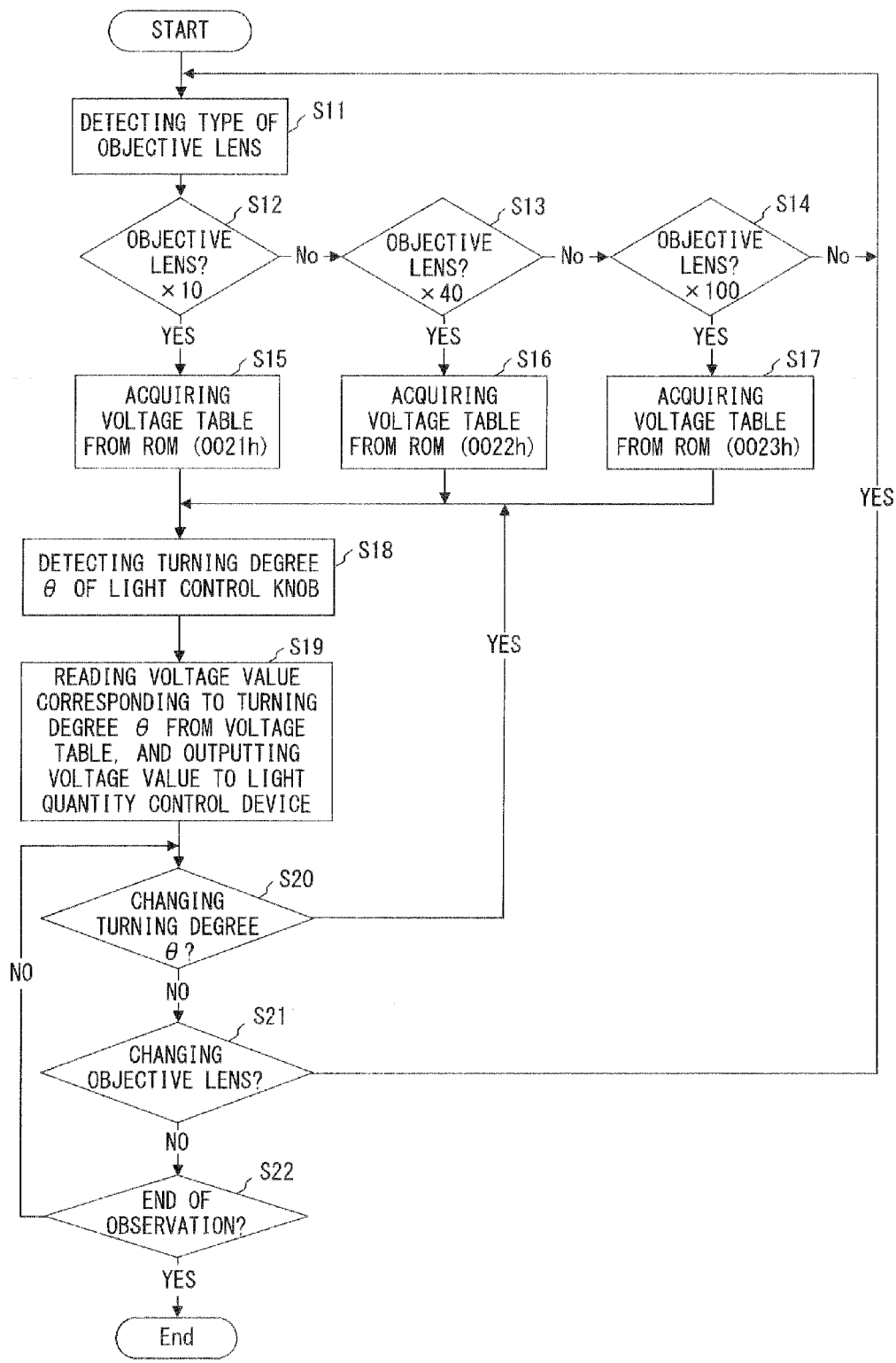
F I G. 9

10x OBJECTIVE LENS

| NO. | DEGREE $\theta$ [°] | VOLTAGE [mV] | QUANTITY OF LIGHT $I = I(\theta)$ [lx] |
|---|---|---|---|
| 1 | 0 | 0 | 0 |
| 2 | 15 | 22.3 | 15 |
| 3 | 30 | 44.6 | 30 |
| 4 | 45 | 67.0 | 45 |
| ⋮ | ⋮ | ⋮ | ⋮ |
| 22 | 315 | 469 | 315 |
| 23 | 330 | 491 | 330 |
| 24 | 345 | 513 | 345 |
| 25 | 360 | 536 | 360 |

F I G.  1 0 A

40x OBJECTIVE LENS

| NO. | DEGREE $\theta$ [°] | VOLTAGE [mV] | QUANTITY OF LIGHT $I = I(\theta) + 360$ [lx] |
|---|---|---|---|
| 1 | 0 | 179 | 360 |
| 2 | 15 | 201 | 405 |
| 3 | 30 | 223 | 450 |
| 4 | 45 | 245 | 495 |
| ⋮ | ⋮ | ⋮ | ⋮ |
| 22 | 315 | 647 | 1305 |
| 23 | 330 | 669 | 1350 |
| 24 | 345 | 692 | 1395 |
| 25 | 360 | 714 | 1440 |

F I G.   1 0 B

100x OBJECTIVE LENS

| NO. | DEGREE $\theta$ [°] | VOLTAGE [V] | QUANTITY OF LIGHT $I = I(\theta) + 1440$ [lx] |
|---|---|---|---|
| 1 | 0 | 357 | 1440 |
| 2 | 15 | 379 | 1530 |
| 3 | 30 | 402 | 1620 |
| 4 | 45 | 424 | 1710 |
| ⋮ | ⋮ | ⋮ | ⋮ |
| 22 | 315 | 826 | 3330 |
| 23 | 330 | 848 | 3420 |
| 24 | 345 | 870 | 3510 |
| 25 | 360 | 892 | 3600 |

F I G. 1 0 C

10x OBJECTIVE LENS

| NO. | DEGREE θ [°] | VOLTAGE [mV] | QUANTITY OF LIGHT I= I (θ) [lx] |
|---|---|---|---|
| 1 | 0 | 0 | 0 |
| 2 | 15 | 22.3 | 15 |
| 3 | 30 | 44.6 | 30 |
| 4 | 45 | 67.0 | 45 |
| ... | ... | ... | ... |
| 22 | 315 | 469 | 315 |
| 23 | 330 | 491 | 330 |
| 24 | 345 | 513 | 345 |
| 25 | 360 | 536 | 360 |

F I G. 1 2 A

40x OBJECTIVE LENS

| NO. | DEGREE $\theta$ [°] | VOLTAGE [mV] | QUANTITY OF LIGHT $I = I(\theta) + 360 [lx]$ |
|---|---|---|---|
| 1 | 0 | 0 | 0 |
| 2 | 15 | 201 | 405 |
| 3 | 30 | 223 | 450 |
| 4 | 45 | 245 | 495 |
| ⋮ | ⋮ | ⋮ | ⋮ |
| 22 | 315 | 647 | 1305 |
| 23 | 330 | 669 | 1350 |
| 24 | 345 | 692 | 1395 |
| 25 | 360 | 714 | 1440 |

FIG. 12B

100x OBJECTIVE LENS

| NO. | DEGREE $\theta$ [°] | VOLTAGE [V] | QUANTITY OF LIGHT $I = I(\theta) + 1440$ [lx] |
|---|---|---|---|
| 1 | 0 | 0 | 0 |
| 2 | 15 | 379 | 1530 |
| 3 | 30 | 402 | 1620 |
| 4 | 45 | 424 | 1710 |
| ⋮ | ⋮ | ⋮ | ⋮ |
| 22 | 315 | 826 | 3330 |
| 23 | 330 | 848 | 3420 |
| 24 | 345 | 870 | 3510 |
| 25 | 360 | 892 | 3600 |

FIG. 12C

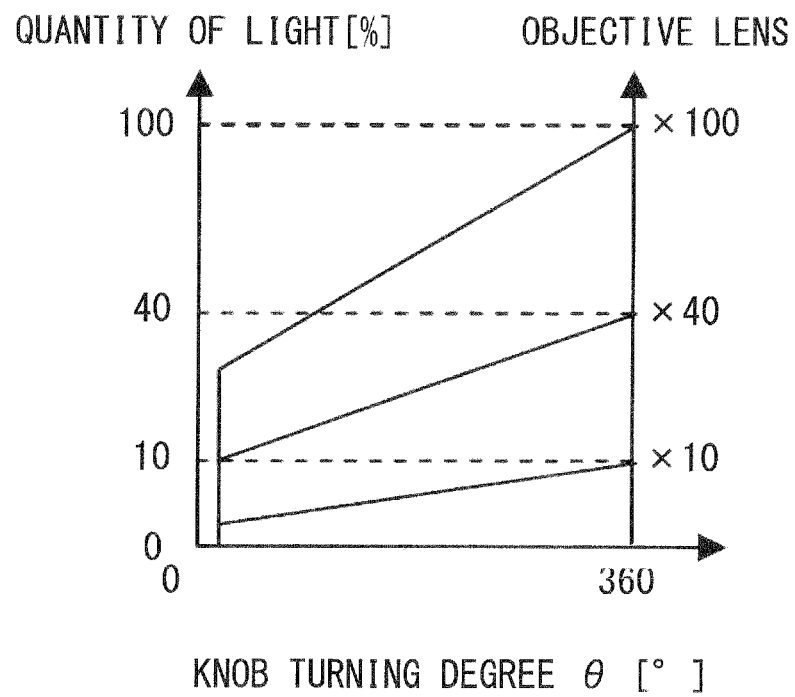
F I G. 13

10x OBJECTIVE LENS (I=EXP($\theta$)[lx])

| NO. | DEGREE $\theta$ [°] | VOLTAGE [mV] | QUANTITY OF LIGHT I=0.672*EXP($\theta$)[lx] |
|---|---|---|---|
| 1 | 0 | 0.00 | 0.00 |
| 2 | 15 | 1.30 | 0.87 |
| 3 | 30 | 1.68 | 1.13 |
| 4 | 45 | 2.19 | 1.47 |
| ... | ... | ... | ... |
| 22 | 315 | 244 | 164 |
| 23 | 330 | 316 | 212 |
| 24 | 345 | 391 | 263 |
| 25 | 360 | 535 | 360 |

FIG. 16A

40x OBJECTIVE LENS (I=EXP($\theta$)[lx])

| NO. | DEGREE $\theta$ [°] | VOLTAGE [mV] | QUANTITY OF LIGHT I=2.0168*EXP($\theta$)+360[lx] |
|---|---|---|---|
| 1 | 0 | 178 | 360 |
| 2 | 15 | 180 | 363 |
| 3 | 30 | 180 | 363 |
| 4 | 45 | 181 | 364 |
| ... | ... | ... | ... |
| 22 | 315 | 423 | 852 |
| 23 | 330 | 494 | 997 |
| 24 | 345 | 570 | 1149 |
| 25 | 360 | 714 | 1440 |

F I G. 1 6 B

100× OBJECTIVE LENS (I=EXP($\theta$)[Ix])

| NO. | DEGREE $\theta$ [°] | VOLTAGE [mV] | QUANTITY OF LIGHT I=4.0336*EXP($\theta$)[Ix]+1440 |
|---|---|---|---|
| 1 | 0 | 357 | 1440 |
| 2 | 15 | 358 | 1445 |
| 3 | 30 | 359 | 1447 |
| 4 | 45 | 359 | 1449 |
| ⋮ | ⋮ | ⋮ | ⋮ |
| 22 | 315 | 601 | 2425 |
| 23 | 330 | 673 | 2714 |
| 24 | 345 | 748 | 3018 |
| 25 | 360 | 892 | 3600 |

F I G. 1 6 C

10x OBJECTIVE LENS (I=EXP($\theta$)[Ix])

| NO. | DEGREE $\theta$ [°] | VOLTAGE [mV] | QUANTITY OF LIGHT I=0.672*EXP($\theta$)[Ix] |
|---|---|---|---|
| 1 | 0 | 0.00 | 0.00 |
| 2 | 15 | 1.30 | 0.87 |
| 3 | 30 | 1.68 | 1.13 |
| 4 | 45 | 2.19 | 1.47 |
| ⋮ | ⋮ | ⋮ | ⋮ |
| 22 | 315 | 244 | 164 |
| 23 | 330 | 316 | 212 |
| 24 | 345 | 391 | 263 |
| 25 | 360 | 535 | 360 |

FIG. 18A

40x OBJECTIVE LENS (I=EXP($\theta$)[Ix])

| NO. | DEGREE $\theta$ [°] | VOLTAGE [mV] | QUANTITY OF LIGHT I=2.0168*EXP($\theta$)+360[Ix] |
|---|---|---|---|
| 1 | 0 | 0 | 0 |
| 2 | 15 | 180 | 363 |
| 3 | 30 | 180 | 363 |
| 4 | 45 | 181 | 364 |
| ⋮ | ⋮ | ⋮ | ⋮ |
| 22 | 315 | 423 | 852 |
| 23 | 330 | 494 | 997 |
| 24 | 345 | 570 | 1149 |
| 25 | 360 | 714 | 1440 |

FIG. 18B

100x OBJECTIVE LENS (I=EXP($\theta$)[Ix])

| NO. | DEGREE $\theta$ [°] | VOLTAGE [mV] | QUANTITY OF LIGHT I=4.0336*EXP($\theta$)[Ix]+1440 |
|---|---|---|---|
| 1 | 0 | 0 | 0 |
| 2 | 15 | 358 | 1445 |
| 3 | 30 | 359 | 1447 |
| 4 | 45 | 359 | 1449 |
| ⋮ | ⋮ | ⋮ | ⋮ |
| 22 | 315 | 601 | 2425 |
| 23 | 330 | 673 | 2714 |
| 24 | 345 | 748 | 3018 |
| 25 | 360 | 892 | 3600 |

FIG. 18C

MICROSCOPE SYSTEM AND METHOD FOR CONTROLLING IT

CROSS REFERENCE TO RELATED APPLICATION

This application is based on and claims the benefit of priority from the prior Japanese patent Application No. 2009-158157 filed in Japan on Jul. 2, 2009, the entire contents of which are incorporated by this reference.

FIELD

The present invention relates to light control of a microscope system.

BACKGROUND

A conventional halogen lamp light source has been replaced with an LED (light emitting diode) illumination light source as illumination light of a microscope for the following reasons. That is, since a halogen lamp largely changes its color temperature (chromaticity) by light control, it is necessary to provide an optical element such as a darkening filter etc. for light control without changing the chromaticity. On the other hand, an LED can perform the light control only by changing a voltage and a current almost without changing the chromaticity. Therefore, when an LED is used as a light source, it has the merit of requiring no additional configuration. With predetermined quantity of light, an LED requires much less power consumption than a halogen lamp. Accordingly, when an LED is used as a light source, it has the merit of reducing excess power or heat.

As the background of replacing the conventional illumination light source, the emission efficiency of an LED has made rapid improvement, and has realized the luminance that can be used for a microscope.

SUMMARY

The microscope system according to the present invention includes:

an illumination unit illuminating a sample;

a light control direction unit for specifying quantity of light output from the illumination unit;

a storage unit for storing voltage-related information in which a direction value specified by the light control direction unit and a voltage value to be applied to the illumination unit are associated with each other and are set, the voltage-related information being defined for each observation condition of a microscope, the direction value being in an entire range that can be specified by the light control direction unit under each observation condition, the voltage value corresponding to the direction value;

a light quantity control unit for controlling the quantity of light emitted from the illumination unit; and a control unit for acquiring the voltage value corresponding to the direction value specified by the light control direction unit from the voltage-related information corresponding to the observation condition, and allowing the light quantity control unit to control the quantity of light based on the acquired voltage value.

An illumination control device used in a microscope system for controlling light of an illumination light source, comprising:

a direction signal acquisition unit for acquiring a direction signal from a light control direction unit which specifying the quantity of light output from the illumination light source;

a storage unit for storing voltage-related information in which a direction value specified by the light control direction unit and a voltage value to be applied to the illumination unit are associated with each other and are set, the voltage-related information being defined for each observation condition of a microscope, the direction value being in an entire range that can be specified by the light control direction unit under each observation condition, the voltage value corresponding to the direction value;

a light quantity control unit for controlling quantity of light emitted from the light source; and a control unit for acquiring the voltage value corresponding to the direction value specified by the light control direction unit from the voltage-related information corresponding to the observation condition, and allowing the light quantity control unit to control the quantity of light based on the acquired voltage value.

A method for controlling a microscope system, comprising:

specifying quantity of light output from an illumination light source by a light control direction unit;

acquiring a voltage value corresponding to a direction value specified by the light control direction unit from a voltage-related information storage unit depending on an observation condition in voltage-related information storage units by a control unit, each of the voltage-related information storage units storing voltage-related information in which a direction value specified by the light control direction unit and a voltage value to be applied to the illumination unit are associated with each other and are set, the voltage-related information being defined for each observation condition of a microscope, the direction value being in an entire range that can be specified by the light control direction unit under each observation condition, the voltage value corresponding to the direction value; and controlling the quantity of light emitted from the illumination light source based on the acquired voltage value by the light quantity control unit.

BRIEF DESCRIPTION OF DRAWINGS

FIG. 4 is an example of the voltage table according to the first embodiment;

FIG. 9 is a control flow of the range of light control depending on the magnification of an objective lens according to the second embodiment;

FIG. 10A is an example of a voltage table when an objective lens corresponding to the graph (A) in FIG. 7 is used;

FIG. 10B is an example of a voltage table when an objective lens corresponding to the graph (B) in FIG. 7 is used;

FIG. 10C is an example of a voltage table when an objective lens corresponding to the graph (C) in FIG. 7 is used;

FIG. 12A is an example of a voltage table when an objective lens corresponding to the graph (A) in FIG. 11 is used;

FIG. 12B is an example of a voltage table when an objective lens corresponding to the graph (B) in FIG. 11 is used;

FIG. 12C is an example of a voltage table when an objective lens corresponding to the graph (C) in FIG. 11 is used;

FIG. 13 illustrates the light control characteristic when there is the relationship of $I(\theta) \propto \theta$ between the turning degree $\theta$ of a light control knob 4 and the quantity of light $I(\theta)$ in the second embodiment (variation example 2), and the lower limit and the upper limit of the output voltage depending on each of the objective lenses 15 through 17 are stored in the voltage table;

FIG. 16A is an example of a voltage table when an objective lens corresponding to the graph (A) in FIG. 15 is used;

FIG. 16B is an example of a voltage table when an objective lens corresponding to the graph (B) in FIG. 15 is used;

FIG. 16C is an example of a voltage table when an objective lens corresponding to the graph (C) in FIG. 15 is used;

FIG. 18A is an example of a voltage table when an objective lens corresponding to the graph (A) in FIG. 17 is used;

FIG. 18B is an example of a voltage table when an objective lens corresponding to the graph (B) in FIG. 17 is used;

FIG. 18C is an example of a voltage table when an objective lens corresponding to the graph (C) in FIG. 17 is used;

DESCRIPTION OF EMBODIMENTS

Figure 1:
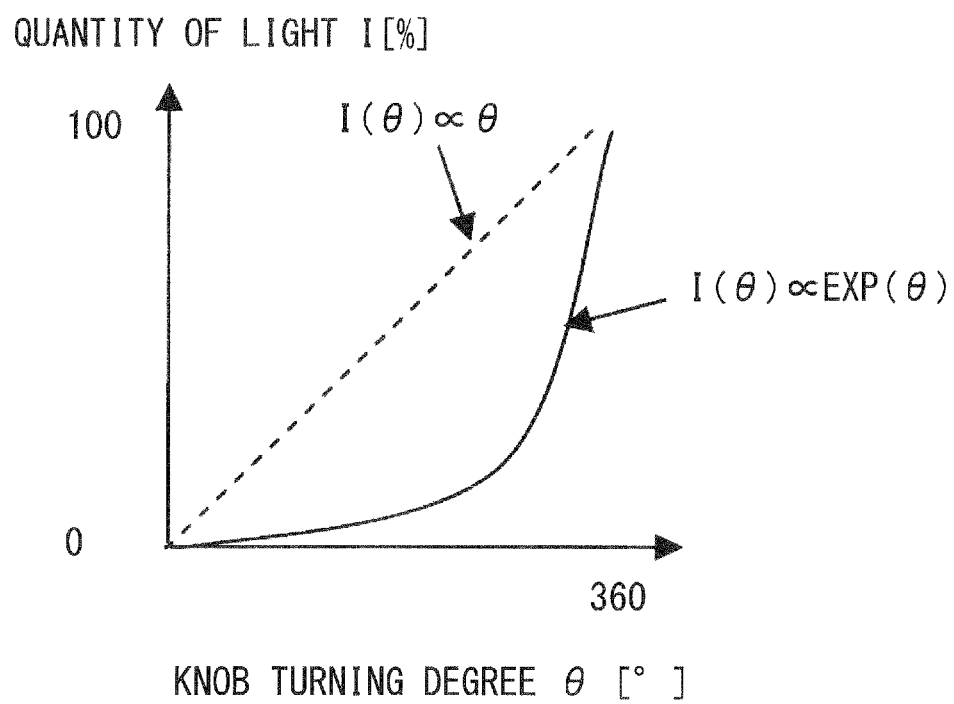
FIG. 1 illustrates the relationship between the turning degree of a normal light control knob and the quantity of light of illumination light.

There are the following problems with an LED illumination system. That is, there is a difference in operability of adjusting the quantity of light in a high power observation and a low power observation occurring from the relationship between the driving voltage (driving current) of an LED and the quantity of emission. In the description below, the rate of increase in quantity of light of an LED to the quantity of light of the LED and the turning degree of alight control knob for adjusting the driving voltage of the LED is defined as light control sensitivity, and the light control sensitivity of the LED is described below.

When the quantity of light of an LED illumination system is adjusted by turning the light control knob, the quantity of light increases by predetermined quantity by 10° turning the light control knob. The increase in quantity of light at this time is +1 [lx]. In this case, (i) when the turning degree increases from 50° to 60°, and the quantity of light at 50° is 5 [lx], the quantity of light at 60 ° is 5+1=6 [lx]. That is, the quantity of light becomes 1.2 times (=6/5) larger, and the rate of increase in quantity of light is 20%. On the other hand, (ii) when the turning degree increases from 250° to 260°, and the quantity of light at 250° is 25 [lx], the quantity of light at 260° is 25+1=26 [lx]. That is, the quantity of light becomes 1.04 (=26/25) larger, and the rate of increase in quantity of light is 4%.

Thus, since the light control sensitivity of the LED indicates the characteristic ($I \propto \theta$) that the quantity of light $I(\theta)$ linearly increases, the rate of increase in quantity of light to the turning degree of the light control knob is different between the low power observation and the high power observation.

On the other hand, the light control sensitivity of a halogen lamp indicates a nonlinear change in the relationship between the turning degree $\theta$ of the light control knob and the quantity of light $I(\theta)$. Therefore, between the low power observation and the high power observation, the rate of increase in quantity of light to the turning degree of the light control knob does not largely fluctuate as compared with the LED. Therefore, from the viewpoint of the operability, the light controlling operation of the LED illumination system is not easy for an observer who is familiar with the light control characteristic of the halogen lamp.

In addition, when the brightness of the illumination light which illuminates a sample is constant, a higher-power objective lens indicates smaller quantity of light on a sample, thereby requiring larger quantity of light. On the other hand, a lower-power objective lens indicates smaller quantity of light. However, since the conventional light control knob indicates a constant increase in quantity of light with respect to a turning degree, the brightness is unnecessarily high in the low power observation which does not require large quantity of light. On the other hand, necessary quantity of light cannot be acquired in the high power observation.

Therefore, various techniques have been proposed to improve the light controlling operation of an LED illumination system. The Japanese Patent No. 04071961 discloses substantially constant light control sensitivity in both low-power and high-power observations when the power of a zoom mechanism is changed. The Japanese Laid-open Patent Publication No. 2004-85959 discloses the technique of preventing insufficient or excessive quantity of light when an objective lens is switched.

However, the Japanese Patent No. 04071961 does not refer to the light control sensitivity when an objective lens is switched. In addition, the Japanese Laid-open Patent Publication No. 2004-85959 can adjust the quantity of light around the set output voltage data, but does not refer to a further light controlling operation. Thus, the conventional technology lacks flexibility in the light controlling operation based on a sample and an observation environment.

To overcome the above-mentioned problems, the embodiments according to the present invention provide a microscope system capable of easily performing an adjustment for the optimum light control sensitivity under any observation conditions.

The microscope system according to the embodiments of the present invention includes an illumination unit, a light control direction unit, a storage unit, a light quantity control unit, and a control unit.

The illumination unit illuminates a sample. The illumination unit is configured by, for example, a solid semiconductor element, and corresponds to a white LED 6 according to the present embodiment.

The light control direction unit specifies the quantity of light output by the illumination unit. The light control direction unit corresponds to, for example, a light control knob 4 according to the present embodiment.

The storage unit stores voltage-related information. The storage unit corresponds to, for example, ROM 1 according to the present embodiment. There is voltage-related information for each observation condition of a microscope. In the voltage-related information, direction values specified by the light control direction unit and voltage values to be applied to the illumination unit are associated with each other and are set. In each observation condition, the direction values are in the entire range that can be specified by the light control direction unit. Each of The voltage value is corresponding to each of the direction value. The voltage-related information corresponds to, for example, a voltage table according to the present embodiment.

The light quantity control unit controls the quantity of light emitted by the illumination unit. The light quantity control unit corresponds to, for example, a light quantity control device 3 according to the present embodiment.

The control unit acquires a voltage value corresponding to the direction value specified by the light control direction unit from the voltage-related information, and allows the light quantity control unit to control the quantity of light based on the acquired voltage value. The control unit corresponds to, for example, a CPU 2 according to the present embodiment.

With the above-mentioned configuration, an adjustment for the optimum light control sensitivity can be easily performed under any observation conditions.

In the microscope system above, the light control direction unit can turn a rotating scale, and can output the turning degree $\theta$ of the scale as directive information. In this case, the voltage value set in each piece of voltage-related information is set so that the relationship between the turning degree $\theta$ of the light control direction unit and the quantity of light of the illumination unit refers to $I(\theta) \propto \theta$ or $I(\theta) \propto EXP(\theta)$.

With the above-mentioned configuration, the entire range of the light control knob can be used under any observation conditions. Accordingly, the light control can be finely performed.

The microscope system above can further include an objective lens switch unit and an objective lens detection unit.

The objective lens switch unit can support one or more objective lenses, and can switch the objective lenses arranged on the optical path for observation in the plurality of objective lenses. The objective lens switch unit corresponds to, for example, a revolver 8 according to the present embodiment.

The objective lens detection unit detects an objective lens arranged on the optical path for observation in the plurality of objective lenses. The objective lens detection unit corresponds to, for example, a sensor 11 according to the present embodiment.

In this case, in each piece of the voltage-related information, a voltage value depending on the type of the objective lens and corresponding to the direction value of the entire range that can be specified by the light control direction unit is set. In addition, the control unit selects the voltage-related information corresponding to the objective lens detected by the objective lens detection unit from among the pieces of voltage-related information, acquires a voltage value corresponding to the direction value specified by the light control direction unit from the selected voltage-related information, and allows the light quantity control unit to control the quantity of light based on the acquired voltage value.

With the configuration, the entire range of the light control knob can be used after selecting any objective lens, thereby performing a fine adjustment of the light control.

The microscope system can further include an observation method switch unit. The observation method switch unit can switch observation methods. The observation method switch unit corresponds to, for example, an observation method switch 7 according to the present embodiment.

In this case, in each piece of the voltage-related information, a voltage value depending on the observation method and corresponding to the direction value of the entire range that can be specified by the light control direction unit is set. The control unit selects the voltage-related information corresponding to the observation method switched by the observation method switch unit from among the pieces of voltage-related information, acquires the voltage value corresponding to the direction value specified by the light control direction unit from the selected voltage-related information, and allows the light quantity control unit to control the quantity of light based on the acquired voltage value.

With the configuration, the entire range of the light control knob can be used after selecting any observation method, thereby performing a fine adjustment of the light control.

In the microscope system, the light quantity control unit can control the quantity of light of illumination light by changing the energizing pulse width to the illumination unit.

Described below is the embodiment of the present invention.

<First Embodiment>

Described below is the microscope system in which, according to the first embodiment, since the characteristic of the light control sensitivity in an LED is improved, the rate of change in quantity of light to the turning degree of the light control knob can be constant by having the relationship of $I(\theta) \propto EXP(\theta)$ between the turning degree θ of the light control knob and the quantity of light $I(\theta)$.

FIG. 1 illustrates the relationship between the turning degree of a normal light control knob and the quantity of light. Assuming that the case (i) above refers to the turning degree in the low power observation and the case (ii) above refers to the turning degree in the high power observation, the light control sensitivity is different between the low and high power observations because the light control characteristic of an LED refers to a linear increase of the quantity of light $I(\theta)$ to the turning degree θ of the light control knob as indicated by the broken line in FIG. 1.

Ideal light control sensitivity refers to a constant rate of increase in quantity of light at any magnification. A constant rate of increase in quantity of light is described below. That is, for example, if the quantity of light at 50° is 10% when the turning degree 10° increases, (i') when the turning degree increases from 50° to 60°, and the quantity of light at 50° is 5 [lx], the quantity of light at 60° is 5×1.1=5.5 [lx]. On the other hand, (ii') when the turning degree increases from 250° to 260°, and the quantity of light at 250° is 25 [lx], the quantity of light at 260° is 25×1.1=27.5 [lx].

The light control sensitivity is expressed by the curve of the solid line in FIG. 1, and the relationship between the turning degree θ of the light control knob and the quantity of light $I(\theta)$ is expressed by $I(\theta) \propto EXP(\theta)$. In the illumination system of the conventional halogen lamp has the light control characteristic of $I(\theta) \propto EXP(\theta)$ substantially.

Figure 2:
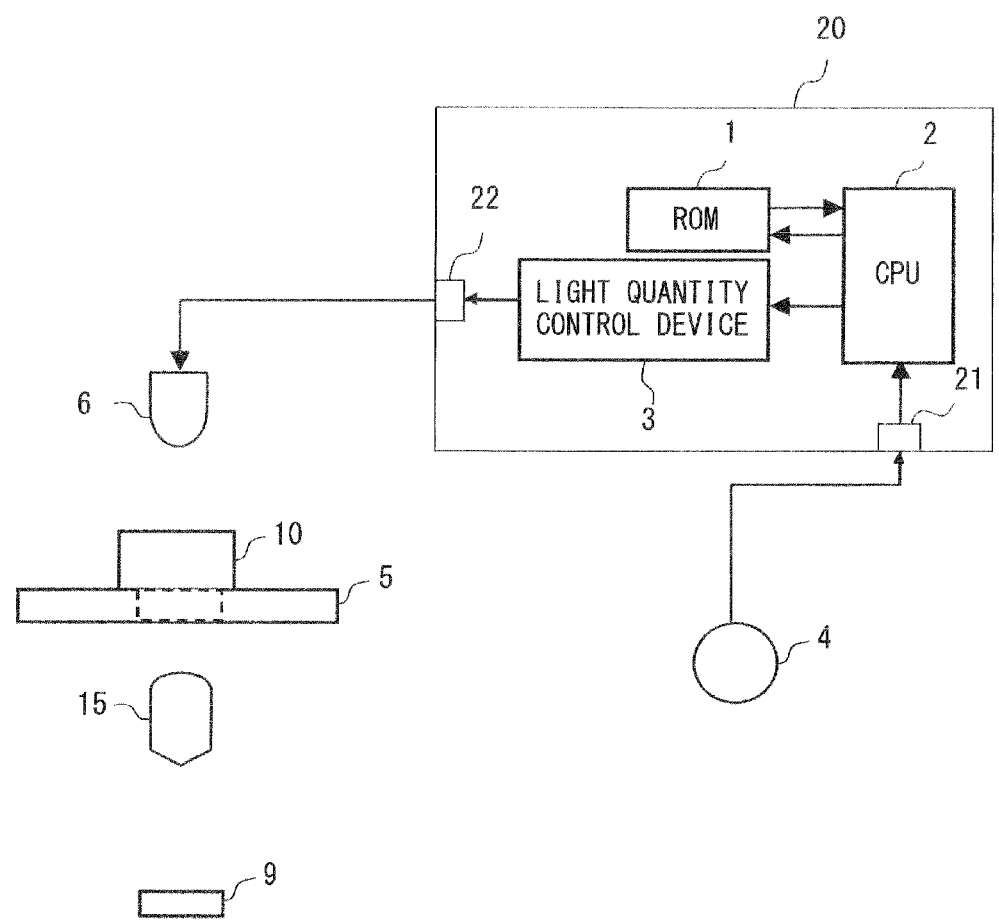
FIG. 2 is an entire configuration (first configuration example) of the microscope system according to the first embodiment.

FIG. 2 is an entire configuration (first configuration example) of the microscope system according to the first embodiment. FIG. 2 illustrates the configuration of the microscope system in an observation method in which transmission light from a sample is used. The microscope system is mainly configured by a microscope device body, an illumination control device 20, and the light control knob 4. The microscope device body has a stage 5, the white LED 6, an objective lens 15, and an eyepiece 9.

The illumination control device 20 has the ROM (read only memory) 1, the CPU (central processing unit) 2, the light quantity control device 3, an input interface (hereinafter an interface is referred to as an I/F) 21, and an I/F 22 for a light source.

The input I/F 21 is connected to the light control knob 4 as a light control direction unit, and receives an operation direction signal from the light control knob 4. The white LED 6 is connected to the I/F 22 for a light source. The illumination control device 20 can also includes an interface for connection to the microscope body and other peripheral devices.

The stage 5 is loaded with a sample 10, and an aperture is provided at the center of the stage. The objective lens 15 and the eyepiece 9 are positioned below the stage 5. The white LED 6 is used as an illumination light source. The light control knob 4 as a rotatable dial specifies the quantity of light of the white LED 6.

The CPU 2 is connected to the input I/F 21, the I/F 22 for a light source, the ROM 1, and the light quantity control device 3. The CPU 2 can receive a direction signal from the light control knob 4 through the input I/F 21.

The ROM 1 records a voltage table storing the voltage value associated with the turning degree θ of the light control knob 4 as expressed by the relationship of $I(\theta) \propto EXP(\theta)$ between the quantity of light $I(\theta)$ and the turning degree θ of the light control knob 4.

The light quantity control device 3 is configured by an A/D converter, a PWM (pulse width modulation) control device, etc. By the function of the PWM control device, the light quantity control device 3 can supply a voltage to the white LED 6 by varying the energizing pulse width. The energizing pulse width varies from the minimum pulse width to the maximum pulse width depending on the value 0 through 255 output from the A/D converter. When the pulse width is the maximum, continuous lightening is performed. Thus, the light quantity control device 3 can control the quantity of light of the white LED 6 through the I/F 22 for a light source.

The information about the turning degree of the light control knob 4 is sequentially detected by the CPU 2. The CPU 2 reads a voltage value from the voltage table (for example at the storage address of 0011h) stored in the ROM 1. The CPU 2 sets the read voltage value in the light quantity control device 3. The light quantity control device 3 controls the quantity of light of the white LED 6 based on the set voltage value.

The change of the quantity of light by the turning degree of the light control knob 4 can be freely changed by using the voltage table stored in the ROM 1.

Figure 3:
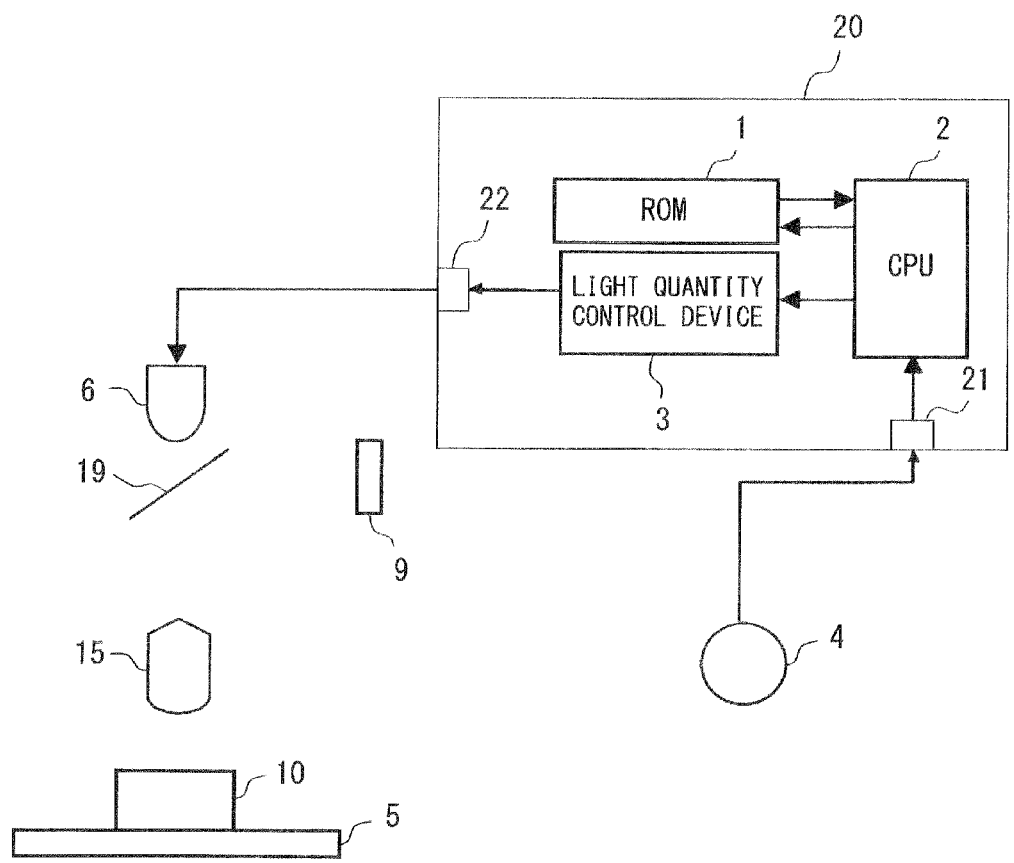
FIG. 3 is an entire configuration (second configuration example) of the microscope system according to the first embodiment.

FIG. 3 is an entire configuration (second configuration example) of the microscope system according to the first embodiment. In the observation method using reflected light, a mirror 19 having the transmittance for transmission of the light of the white LED 6 and the reflectance for reflection of the light from the sample 10 is added to the configuration illustrated in FIG. 2. In this case, the objective lens 15 and the eyepiece 9 is set above the sample 10. The present embodiment can be applied to the microscope system having the configurations illustrated in FIGS. 2 and 3, but the configuration illustrated in FIG. 2 is described below for convenience in explanation.

FIG. 4 is an example of the voltage table according to the first embodiment. The voltage table in FIG. 4 stores a turning degree θ and a voltage value corresponding to the turning degree θ so that the relationship of $I(\theta) \propto EXP(\theta)$ can hold between the turning degree θ of the light control knob 4 and the quantity of light $I(\theta)$. In FIG. 4, a voltage value is set for each turning degree of 15° of the light control knob 4.

Figure 5:
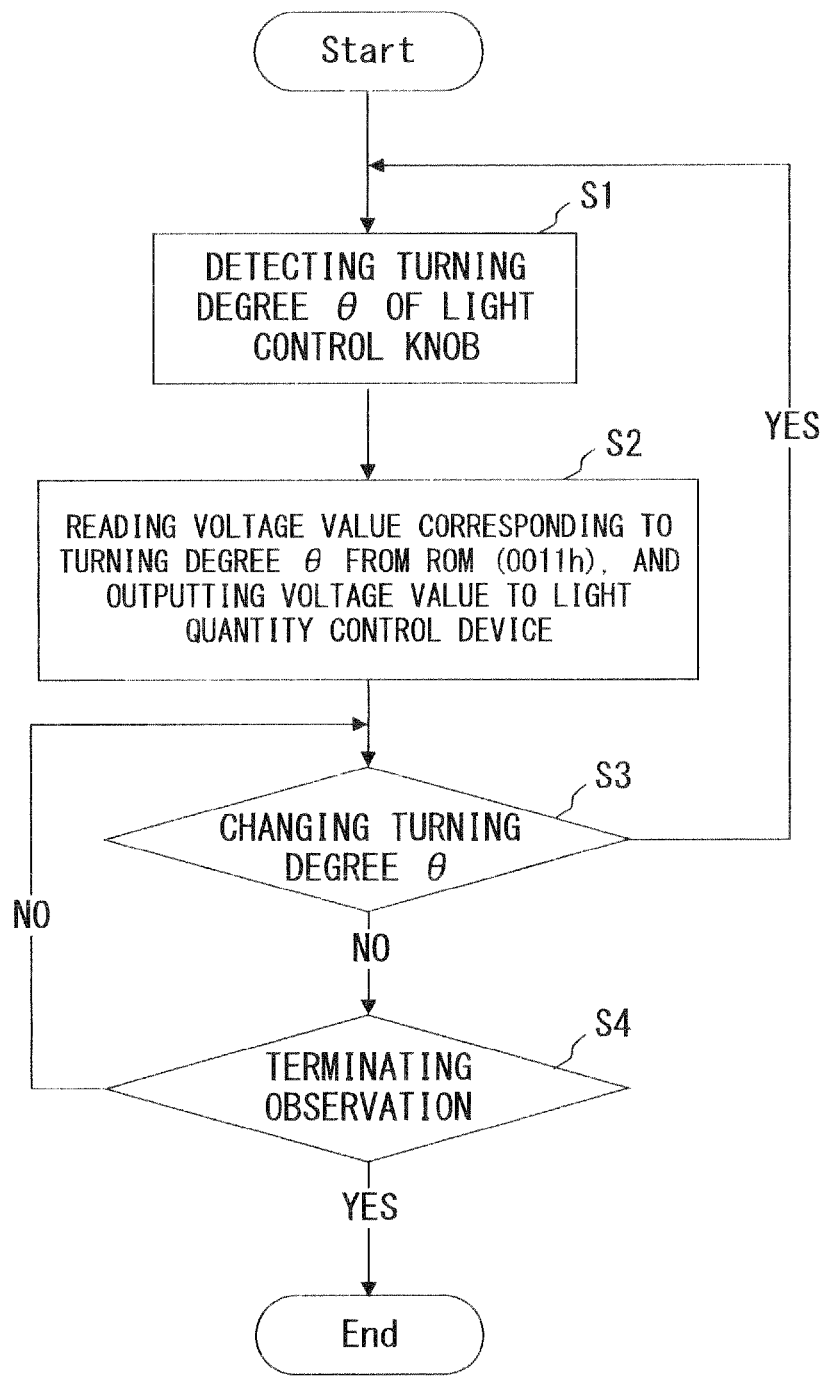
FIG. 5 is the control flow of light control sensitivity according to the first embodiment.

FIG. 5 is the control flow of light control sensitivity according to the first embodiment. The light control method is described below with reference to FIG. 5. When an observer rotates the light control knob 4, the value of the turning degree θ is detected by the CPU 2 (S1). The CPU 2 reads the voltage value corresponding to the turning degree θ from the voltage table stored in the ROM 1, and outputs the value to the light quantity control device 3 (S2). The light quantity control device 3 provides the power based on the voltage value got the white LED 6.

If the light control knob 4 is continuously turned (YES in S3), control is returned to S1, and the light control can be performed again. When the observation is continued (NO in S4), control is returned to S3. If the observation is terminated (YES in S4), the present flow terminates. In this case, the relationship of $I(\theta) \propto EXP(\theta)$ holds between the turning degree θ of the light control knob 4 and the quantity of light $I(\theta)$, thereby indicating the light control characteristic by the solid line in FIG. 1. As a result, the rate of change in quantity of light to the turning degree of the light control knob is constant. Thus, constant light control sensitivity can be acquired regardless of the magnification of the objective lens.

<Second Embodiment>

Described below is the microscope system in the second embodiment in which when the relationship of $I(\theta) \propto \theta$ holds between the turning degree $\theta$ of the light control knob and the quantity of light $I(\theta)$, the light control can be finely adjusted by changing the range in which light control can be performed depending on the objective lens.

Figure 6:
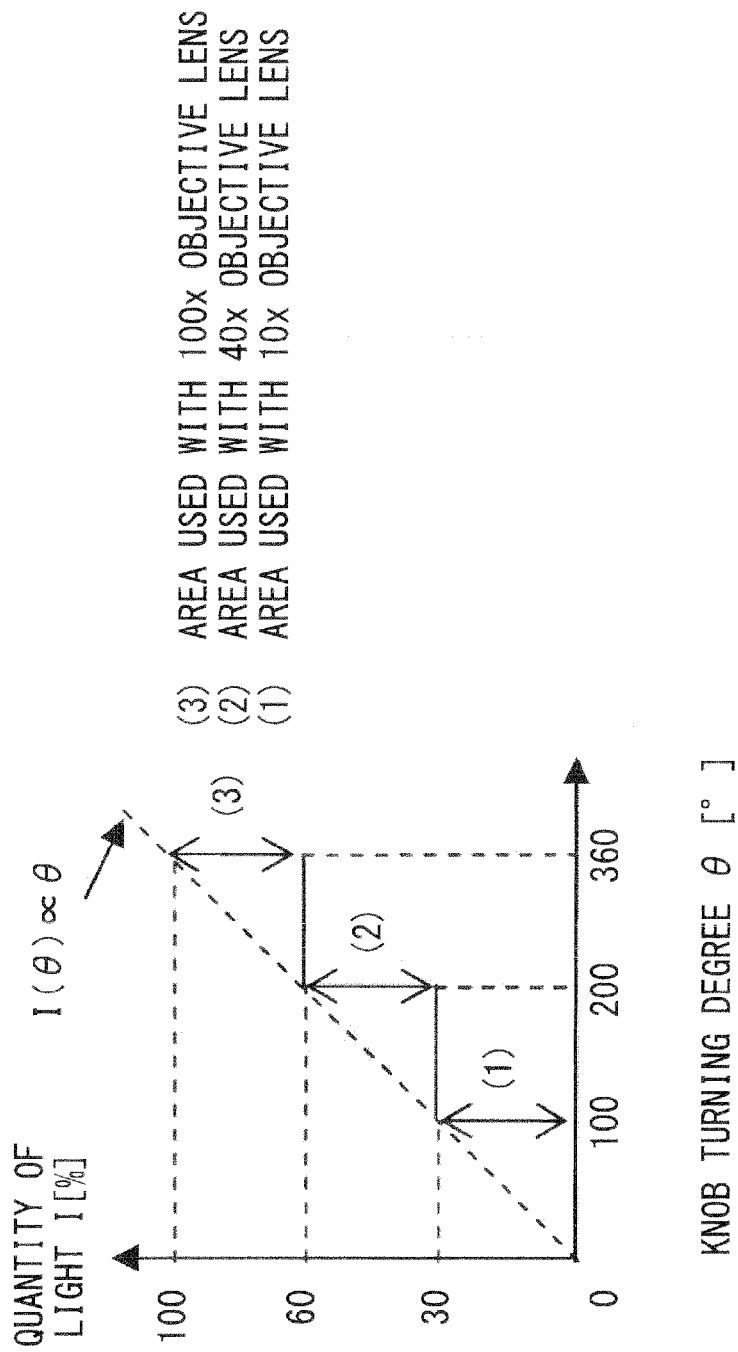
FIG. 6 illustrates the range of light control of the light control knob used for each objective lens when the relationship of $I(\theta) \propto \theta$ between the turning degree $\theta$ of the light control knob and the quantity of light $I(\theta)$, and a voltage table shared in all objective lenses is used.

FIG. 6 illustrates the range of light control of the light control knob used for each objective lens when the relationship of $I(\theta) \propto \theta$ between the turning degree $\theta$ of the light control knob and the quantity of light $I(\theta)$, and a voltage table shared in all objective lenses is used.

In the observation by a microscope, when the magnification of the objective lens increases, larger quantity of light is required. On the other hand, in a lower-power observation area, smaller quantity of light is required. When three types of objective lenses, that is, the lenses of 10×, 40×, and 100×, are used, the range of the quantity of light required by each objective lens is illustrated by the graph in FIG. 6.

For the maximum value of the quantity of light or a light source, the quantity of light of each objective lens can be: (1) in the range of 0 through 30% with a 10× objective lens; (2) in the range of 30 through 60% with a 4× objective lens; and (3) in the range of 60 through 100% with a 100× objective lens. Therefore, the range of light control knob is limited depending on the objective lens to be used. Accordingly, there are the problems that it is difficult to finely adjust the light control, that a wasteful light controlling operation is performed in a range of unnecessary quantity of light, that the rate of increase in quantity of light is not constant, etc. Therefore, in the present embodiment, a voltage table is provided for each objective lens as illustrated in FIG. 7, and the voltage table is set depending on each objective lens.

Figure 7:
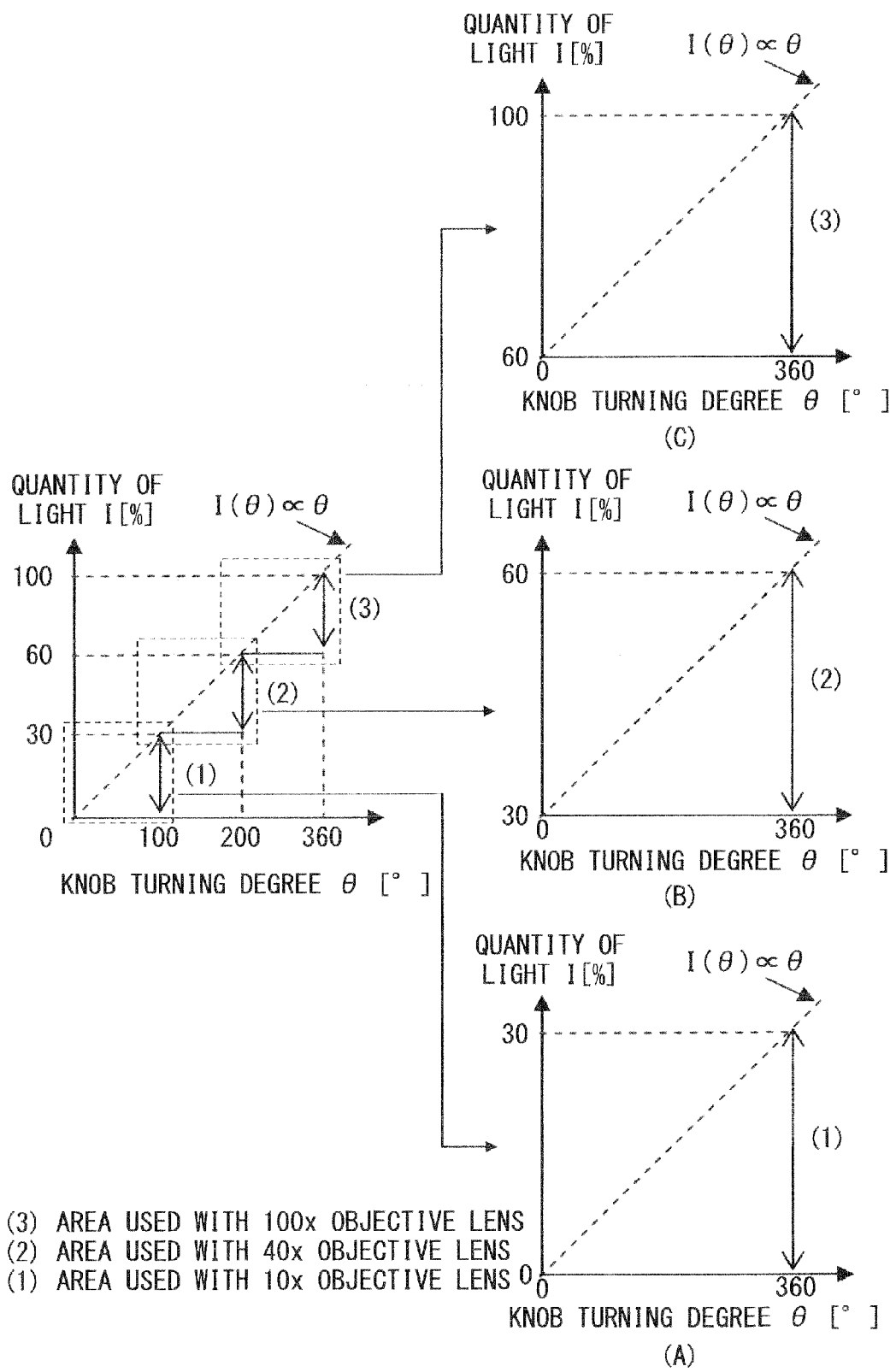
FIG. 7 is a graph in which the range of light control is set for each objective lens in the second embodiment.

FIG. 7 is a graph in which the range of light control is set for each objective lens in the second embodiment. The left graph in FIG. 7 is the same as the graph in FIG. 6, and illustrates the range of light control of the light control knob used in each objective lens when a common voltage table is used for all objective lenses.

The graph (A) in FIG. 7 illustrates the light control characteristic (1) when a voltage table in which the light control area (range of the quantity of light of 0 through 30%) available for the 10× objective lens as illustrated in the left graph in FIG. 7 is extracted so that the turning degree of the light control knob 0 through 100° can be used in the range of the light control knob 0 through 360° is used.

The graph (B) in FIG. 7 illustrates the light control characteristic (2) when a voltage table in which the light control area (range of the quantity of light of 30 through 60%) available for the 40× objective lens as illustrated in the left graph in FIG. 7 is extracted so that the turning degree of the light control knob 100 through 200° can be used in the range of the light control knob 0 through 360° is used.

The graph (C) in FIG. 7 illustrates the light control characteristic (3) when a voltage table in which the light control area (range of the quantity of light of 60 through 100%) available for the 100× objective lens as illustrated in the left graph in FIG. 7 is extracted so that the turning degree of the light control knob 200 through 360° can be used in the range of the light control knob 0 through 360° is used.

In any graphs (A) through (C) in FIG. 7, there is the relationship of $I(\theta) \propto \theta$ between the turning degree $\theta$ of the light control knob and the quantity of light $I(\theta)$. Thus, the area of the necessary quantity of light for each objective lens can be adjusted. Therefore, the operability in finely adjusting the light control can be improved.

The present embodiment is described below in detail. In the present embodiment, the same configuration as in the first embodiment is assigned the same reference numeral, and the description is omitted here.

Figure 8:
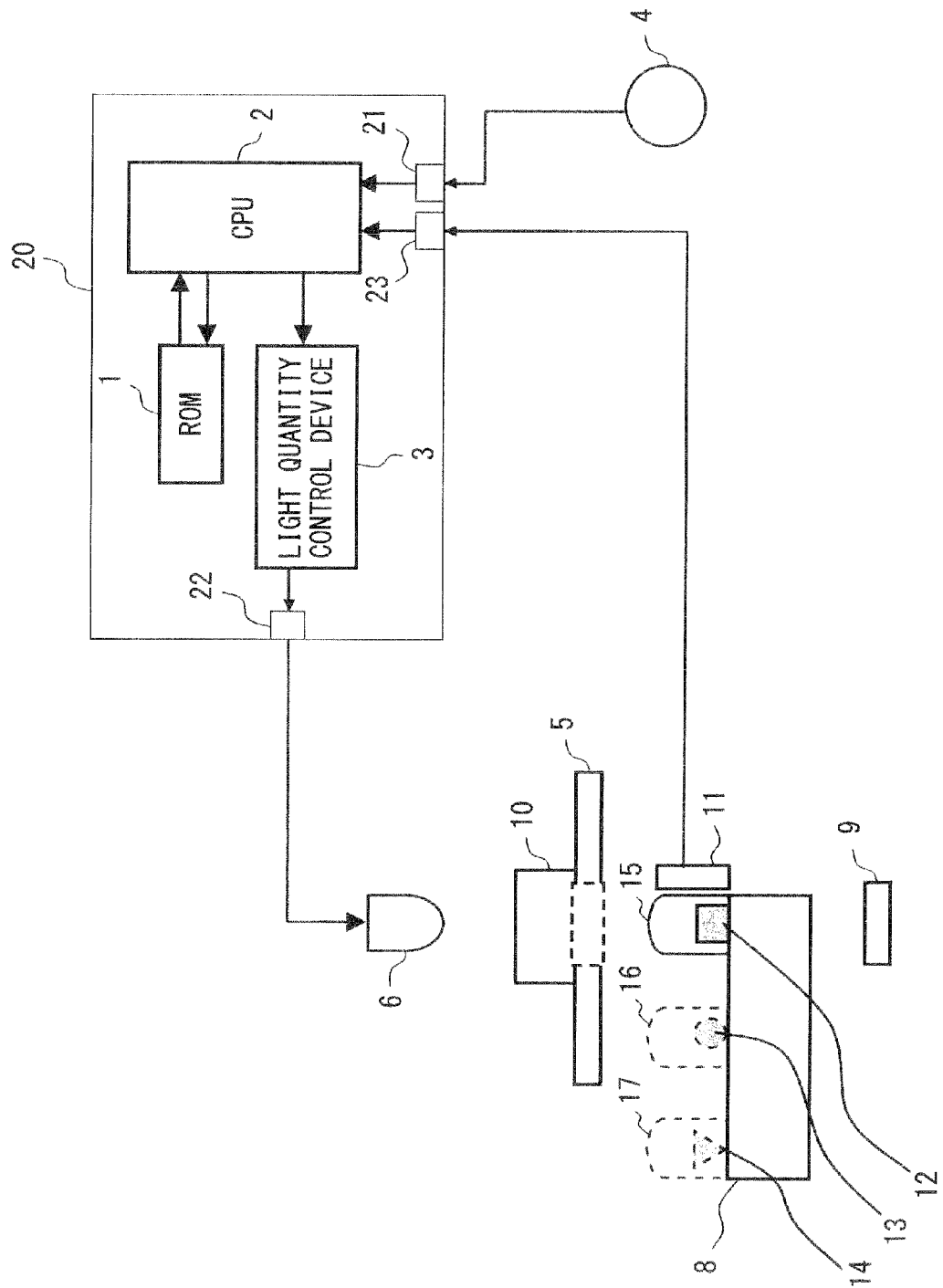
FIG. 8 is an entire configuration of the microscope system according to the second embodiment.

FIG. 8 is an entire configuration of the microscope system according to the second embodiment. The configuration illustrated in FIG. 8 is obtained by adding the revolver 8, the sensor 11, magnets 12, 13, and 14, the objective lenses 15, 16, and 17, and an input I/F 23 to the configuration illustrated in FIG. 2. These members can be added to the configuration illustrated in FIG. 3.

One or more objective lenses 15 through 17 can be loaded into the revolver 8. The revolver 8 can be manually switched. The input I/F 23 is connected to the sensor 11, and receives a detection signal from the sensor 11.

To detect and identify the objective lenses 15 through 17 arranged on the optical path for observation, the magnets 12 through 14 are loaded respectively into the objective lenses 15 through 17. Based on the number of magnets loaded into the objective lenses, the sensor 11 arranged in the vicinity of the optical axis reacts.

The ROM 1 records a voltage table for each objective lens depending on the objective lens. As the objective lenses 15 through 17, three types of lenses, that is, the lenses of 10×, 40×, and 100×, are used. The voltage tables corresponding to the respective objective lenses are, for example, sequentially assigned to the addresses 0021h, 0022h, and 0023h of the ROM 1.

The CPU 2 is connected to the input I/F 21, the I/F 22 for a light source, the input I/F 23, the ROM 1, and the light quantity control device 3. The CPU 2 can receive a detection signal from the sensor 11 through the input I/F 23.

The information about the turning degree of the light control knob 4 is sequentially detected by the CPU 2. Based on the detection result of the sensor 11, the CPU 2 reads the voltage table of the objective lens being used from the ROM 1. Then, the CPU 2 reads the voltage value from the voltage table depending on the turning degree of the light control knob 4, and outputs the value to the light quantity control device 3. Based on the voltage value, the light quantity control device 3 controls the quantity of light of the white LED 6.

FIG. 9 is a control flow of the range of light control depending on the magnification of an objective lens according to the second embodiment. The light control method is described below with reference to FIG. 9. The number of each of the magnets 12 through 14 respectively loaded into the objective lenses 15 through 17 depends on the magnification of each objective lens. The sensor 11 detects the number of magnets loaded into the objective lens arranged on the optical axis (S11). The sensor 11 transmits the detection result as detected information to the CPU 2.

The CPU 2 receives the detected information from the sensor 11, and identifies the objective lens arranged on the optical axis (S12 through S14). The CPU 2 reads the voltage table corresponding to the identified objective lens from the ROM 1 (S15 through S17). If no detected information is acquired from the sensor 11 in S12 through S14, control is returned to S11.

If the CPU 2 detects the value of the turning degree $\theta$ of the light control knob 4 (S18), the CPU 2 reads the voltage value corresponding to the turning degree $\theta$ from the voltage table acquired in any of S15 through S17, and outputs the voltage value to the light quantity control device 3 (S19). The light quantity control device 3 provides the white LED 6 with the power based on the voltage value.

When the light control knob 4 is turned (S20), control is returned to S18 to perform the light control. When the objective lenses 15 through 17 are changed (S21), control is returned to S11, and the operation can be continued.

When the observation is continued (NO in S22), control is returned to S20. When the observation is terminated (YES in S22), the current flow terminates.

FIGS. 10A, 10B, and 10C are examples of voltage tables when the objective lenses 15, 16, and 17 corresponding to the graphs (A), (B), and (C) in FIG. 7 are used. A voltage value is set for the voltage table corresponding to each objective lens stored in the ROM 1 so that the relationship of $I(\theta) \propto \theta$ can hold between the turning degree $\theta$ of the 4 and the quantity of light $I(\theta)$. The lower limit of the quantity of light in FIG. 10B matches the upper limit in FIG. 10A. The lower limit of the quantity of light in FIG. 10C matches the upper limit in FIG. 10B. Thus, the light control can be finely adjusted depending on the objective lens.

Figure 11:
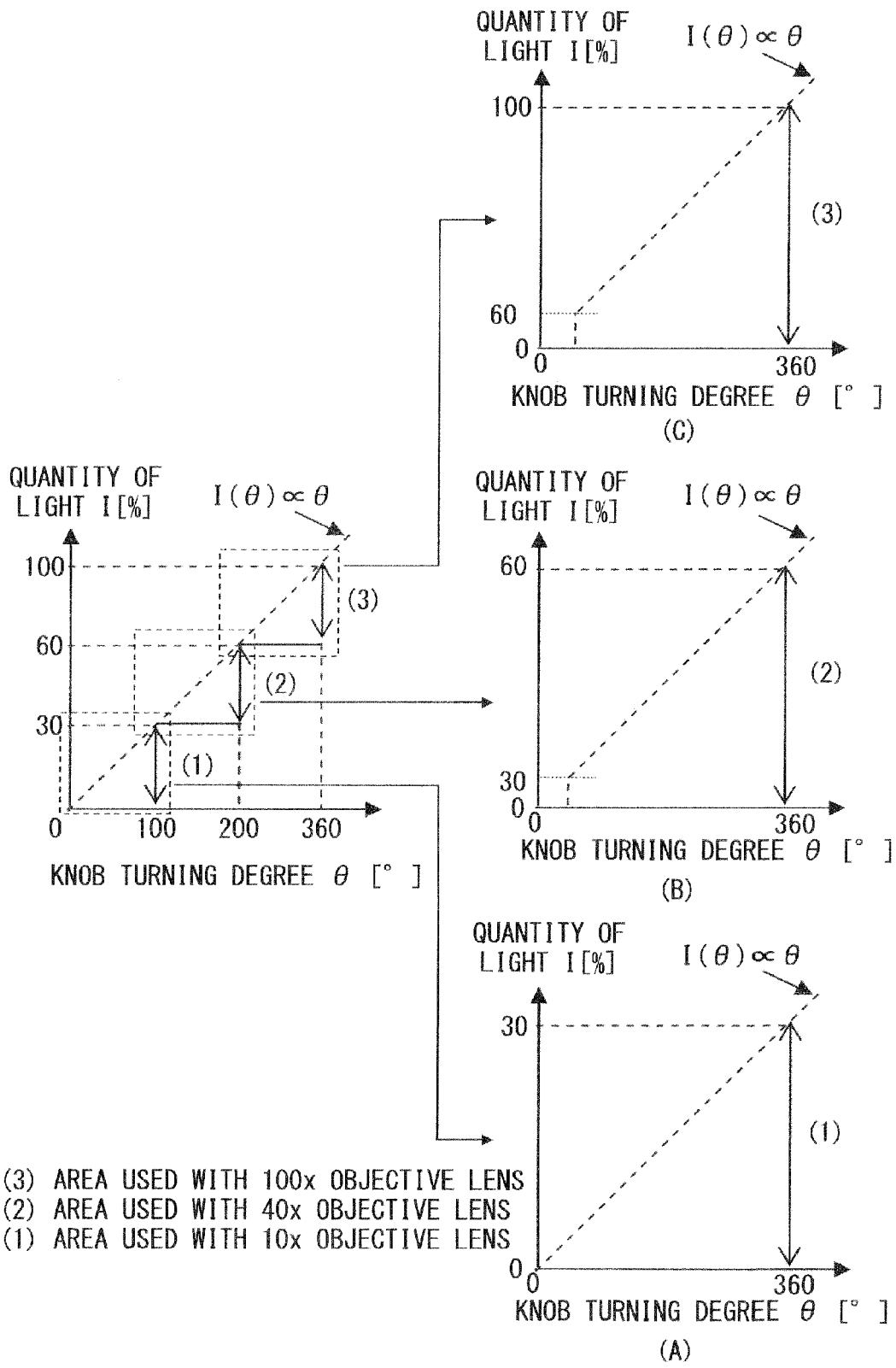
FIG. 11 is a graph in which the range of light control is set for each objective lens in the second embodiment (variation example 1)

FIG. 11 is a graph in which the range of light control is set for each objective lens in the second embodiment (variation example 1). That is, FIG. 11 illustrates a variation of the example in FIG. 7. In the graphs (B) and (C) of FIG. 7, the quantity of light at the turning degree $\theta$ of the light control knob is 0° is 30° and 60° respectively. On the other hand, in FIG. 11, when the quantity of light is set as 0 when the turning degree $\theta$ of the light control knob is 0° through the threshold, and the quantity of light increases depending on the turning degree $\theta$ if the turning degree $\theta$ exceeds the threshold. In this case, the relationship of $I(\theta) \propto \theta$ holds.

Thus, in FIG. 11, when the turning degree $\theta$ of the light control knob is 0° for each objective lens, the quantity of light is 0 [lx], and when the turning degree $\theta$ exceeds a predetermined threshold, the light control can be performed in a range of necessary quantity of light. Thus, the light can be completely turned off in graphs (A), (B), and (C) of FIG. 11, and consistent operability can be realized for all objective lenses and observation methods, thereby successfully improving the operability. In addition, it is useful from the viewpoint of energy-saving to enter the complete turned-off state.

FIGS. 12A, 12B, and 12C are examples of voltage tables when the objective lenses 15, 16, and 17 corresponding to the graphs (A), (B), and (C) in FIG. 11 are used. In FIGS. 12A, 12B, and 12C, the lower limit of the quantity of light is 0. As described above, when the turning degree $\theta$ reaches 15°, the light control can be performed in the range of necessary quantity of light for each objective lens.

FIG. 13 illustrates the light control characteristic when there is the relationship of $I(\theta) \propto \theta$ between the turning degree $\theta$ of a light control knob 4 and the quantity of light $I(\theta)$ in the second embodiment (variation example 2), and the lower limit and the upper limit of the output voltage depending on each of the objective lenses 15 through 17 are stored in the voltage table.

In FIG. 11, when a 10× objective lens is selected, no threshold is set for the turning degree $\theta$ of the light control knob. On the other hand, in FIG. 13, when a 10× objective lens is service, the quantity of light is 0 for the turning degree $\theta$ of the light control knob of 0° through the threshold, and when the turning degree $\theta$ exceeds the threshold, the quantity of light increases depending on the turning degree $\theta$ of the light control knob.

In FIGS. 7 and 11, the ranges of light control of the objective lenses do not overlap each other. On the other hand, in FIG. 13, the ranges of light control between the objective lenses partly overlap each other. In FIG. 13, for example, at the turning degree $\theta$=360° of the light control knob when a 40× objective lens is selected, the quantity of light is 40%, but if the turning degree $\theta$ is nearly 0° when a 100× objective lens is selected, the quantity of light is less than 40%. Thus, a lower limit and an upper limit can be set for the voltage value in the voltage table. Furthermore, a coefficient of $I(\theta) \propto \theta$ can be changed for each objective lens.

According to the second embodiment, any of the degrees from 0 to 360° can be used as the turning degree $\theta$ of the light control knob 4 for each objective lens. Therefore, the light control can be finely adjusted depending on the objective lens.

In addition, a lower limit and an upper limit can be set for the quantity of light that can be controlled depending on the objective lens. Thus, excess quantity of light unnecessary for an observation can be excluded, thereby quickly and easily performing the light controlling operation. Furthermore, various light control characteristics can be acquired by storing a voltage table in accordance with $I(\theta) \propto \theta$ for each objective lens in the ROM 1.

<Third Embodiment>

Described in the third embodiment is the microscope system capable of finely adjusting the light control by changing the range of the light control depending on the objective lens when the relationship of $I(\theta) \propto EXP(\theta)$ holds between the turning degree $\theta$ of the light control knob and the quantity of light $I(\theta)$. The present embodiment is different from the second embodiment in that the light control characteristic in accordance with $I(\theta) \propto \theta$ is replaced with the light control characteristic in accordance with $I(\theta) \propto EXP(\theta)$ for the voltage table.

Figure 14:
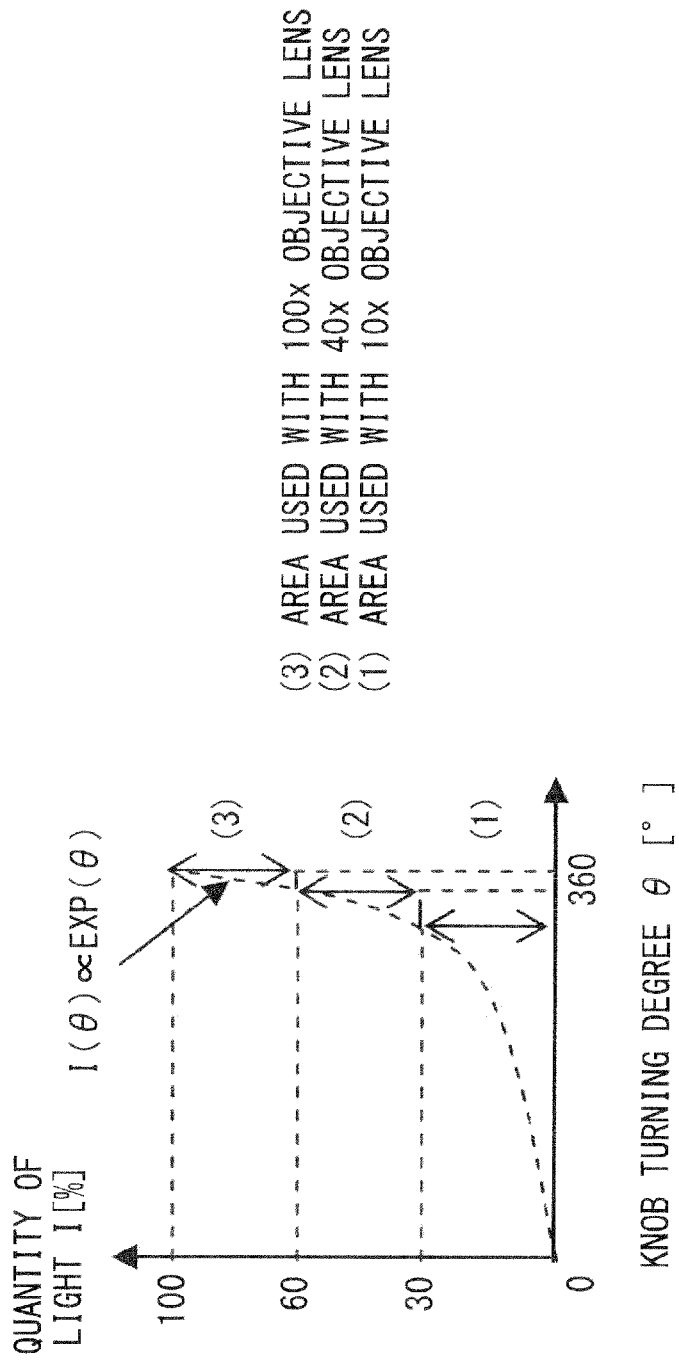
FIG. 14 illustrates the range of light control of the light control knob used for each objective lens when the relationship of $I(\theta) \propto EXP(\theta)$ between the turning degree $\theta$ of the light control knob and the quantity of light $I(\theta)$, and a voltage table shared in all objective lenses is used.

FIG. 14 illustrates the range of light control of the light control knob used for each objective lens when the relationship of $I(\theta) \propto EXP(\theta)$ between the turning degree $\theta$ of the light control knob and the quantity of light $I(\theta)$, and a voltage table shared in all objective lenses is used.

If the relationship between the light control knob and the quantity of light is $I \propto EXP(\theta)$ as in the first embodiment, there arrives the effect that the rate of increase in quantity of light can be constant with any magnification of the objective lens as illustrated in FIG. 14. However, as in FIG. 6, the range in which the light control knob is available is limited for each objective lens. Therefore, according to the present embodiment, a voltage table is set depending on the objective lens as illustrated in FIG. 15.

Figure 15:
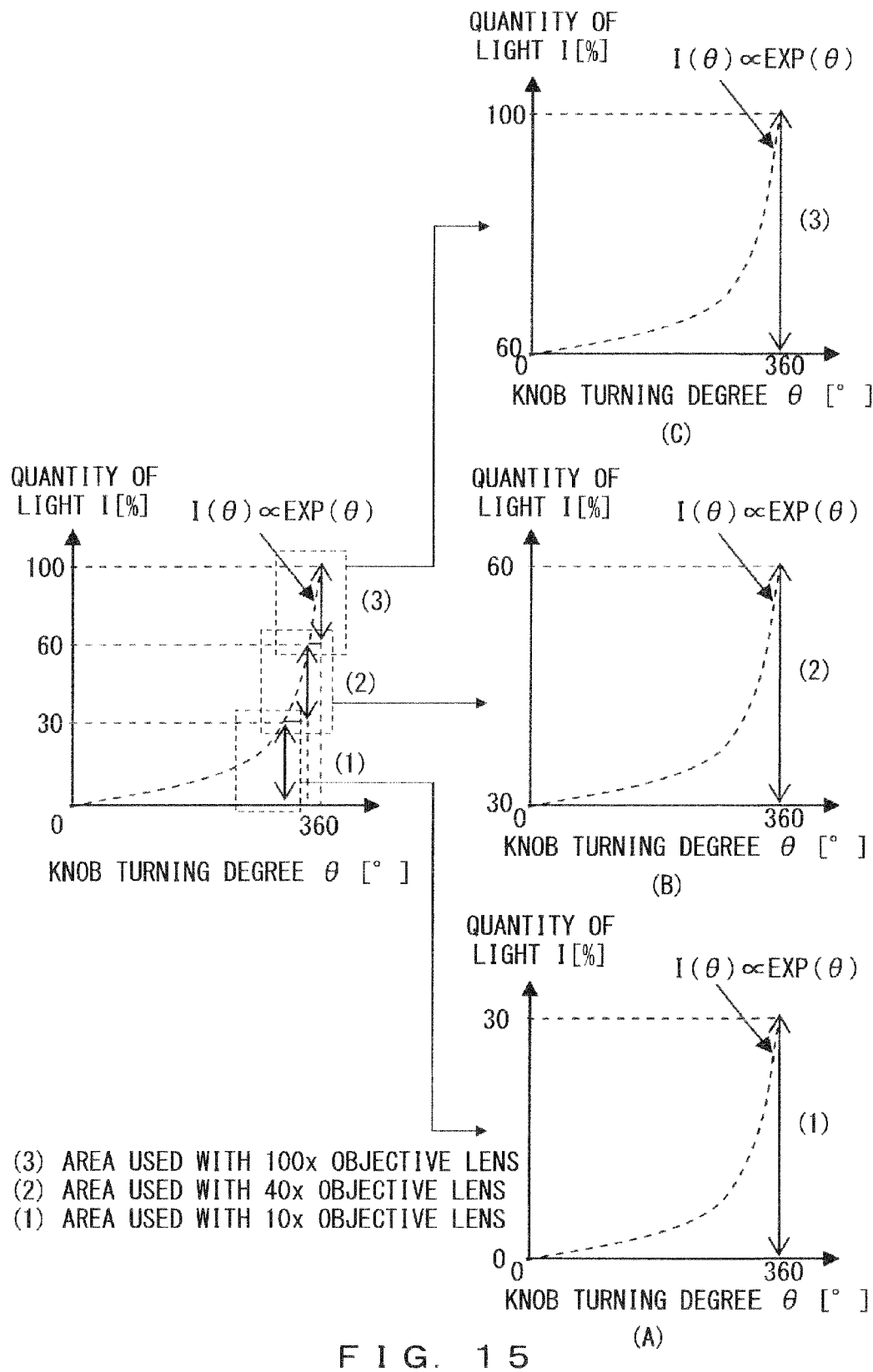
FIG. 15 is a graph in which the range of light control is set for each objective lens in the third embodiment.

FIG. 15 is a graph in which the range of light control is set for each objective lens in the third embodiment. The graph on the left in FIG. 15 is the same as the graph in FIG. 14, and illustrates the range of light control of the light control knob used in each objective lens when a voltage table shared by all objective lenses is used.

The graph (A) in FIG. 15 illustrates the light control characteristic (1) when a voltage table in which the light control area (range of the quantity of light of 0 through 30%) available for the 10× objective lens as illustrated in the left graph in FIG. 7 is extracted so that the turning degree of the light control knob can be used in the range of the light control knob 0 through 360° is used.

The graph (B) in FIG. 15 illustrates the light control characteristic (2) when a voltage table in which the light control area (range of the quantity of light of 30 through 60%) available for the 40× objective lens as illustrated in the left graph in FIG. 7 is extracted so that the turning degree of the light control knob can be used in the range of the light control knob 0 through 360° is used.

The graph (C) in FIG. 15 illustrates the light control characteristic (3) when a voltage table in which the light control area (range of the quantity of light of 60 through 100%) available for the 100× objective lens as illustrated in the left graph in FIG. 7 is extracted so that the turning degree of the light control knob can be used in the range of the light control knob 0 through 360° is used.

In any graphs (A) through (C) in FIG. 15, there is the relationship of I(θ)∝EXP (θ) between the turning degree θ of the light control knob and the quantity of light I(θ). Thus, the area of the necessary quantity of light for each objective lens can be adjusted.

The present embodiment is described below in detail. In the present embodiment, the same configuration as in the first embodiment is assigned the same reference numeral, and the description is omitted here.

The entire configuration of the microscope system according to the third embodiment is the same as the configuration illustrated in FIG. 8. The control flow of the range of light control depending on the magnification of the objective lens according to the third embodiment is the same as the flow illustrated in FIG. 9. The difference from the second embodiment is only the contents of the voltage table acquired in S15 through S17.

FIGS. 16A, 16B, and 16C are examples of voltage tables when the objective lenses 15, 16, and 17 corresponding to the graphs (A), (B), and (C) in FIG. 15 are used. A voltage value is set for the voltage table corresponding to each objective lens stored in the ROM 1 so that the relationship of I(θ)∝EXP (θ) can hold between the turning degree θ of the 4 and the quantity of light I(θ). The lower limit of the quantity of light in FIG. 16B matches the upper limit in FIG. 16A. The lower limit of the quantity of light in FIG. 16C matches the upper limit in FIG. 16B. Thus, the light control can be finely adjusted depending on the objective lens.

Figure 17:
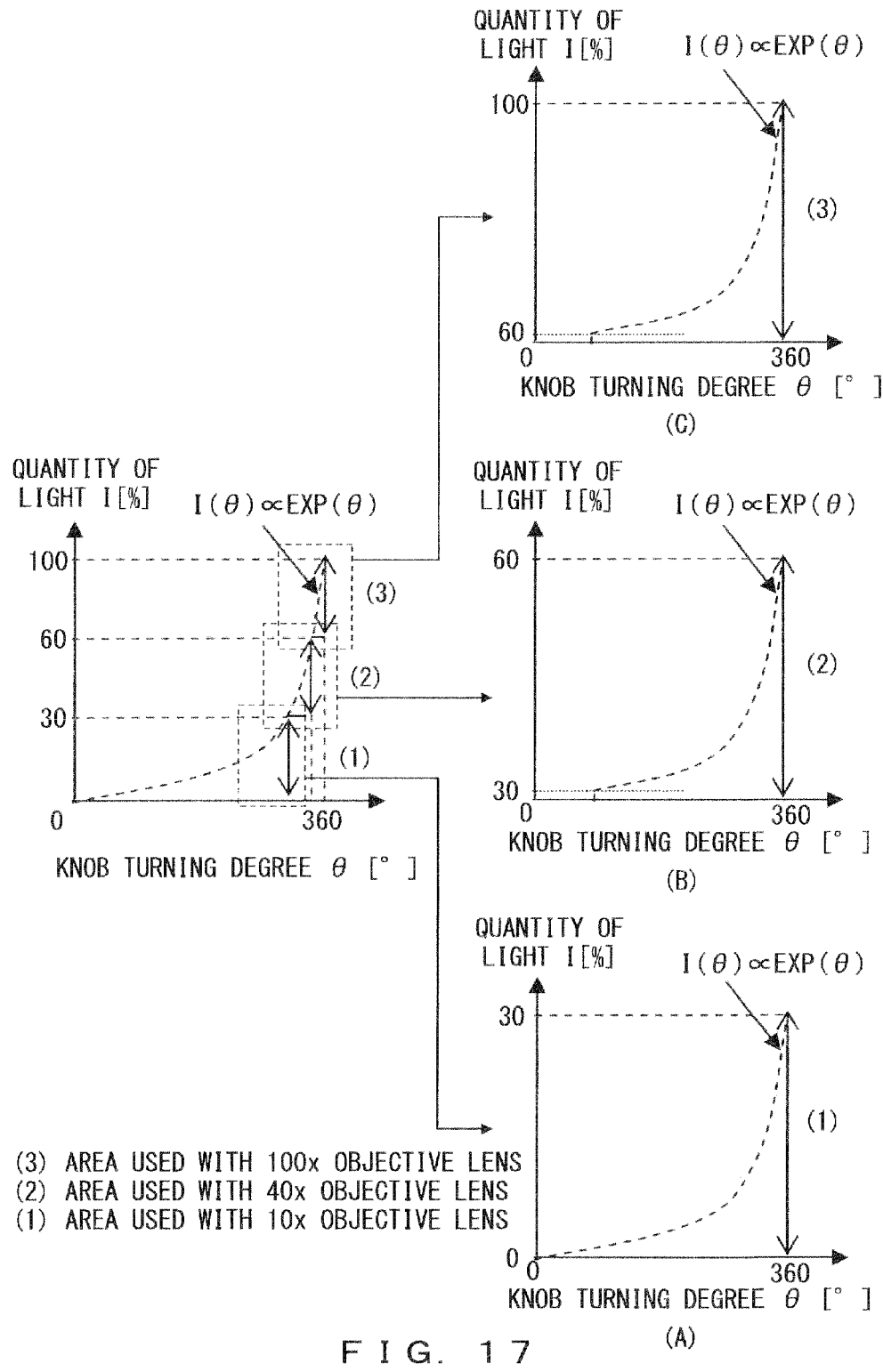
FIG. 17 is a graph in which the range of light control is set for each objective lens in the third embodiment (variation example 1)

FIG. 17 is a graph in which the range of light control is set for each objective lens in the third embodiment (variation example 1). That is, FIG. 17 illustrates a variation of the example in FIG. 15. In the graphs (B) and (C) of FIG. 7, the quantity of light at the turning degree θ of the light control knob is 0° is 30° and 60° respectively. On the other hand, in FIG. 17, when the quantity of light is set as 0 when the turning degree θ of the light control knob is 0° through the threshold, and the quantity of light increases depending on the turning degree θ if the turning degree θ exceeds the threshold. In this case, the relationship of I(θ)∝EXP (θ) holds.

Thus, in FIG. 17, when the turning degree θ of the light control knob is 0° for each objective lens, the quantity of light is 0 [lx], and when the turning degree θ exceeds a predetermined threshold, the light control can be performed in a range of necessary quantity of light. Thus, the light can be completely turned off in graphs (A), (B), and (C) in FIG. 17, and consistent operability can be realized for all objective lenses and observation methods, thereby successfully improving the operability. In addition, it is useful from the viewpoint of energy-saving to enter the complete turned-off state.

FIGS. 18A, 18B, and 18C are examples of voltage tables when the objective lenses 15, 16, and 17 corresponding to the graphs (A), (B), and (C) in FIG. 17 are used. In FIGS. 18A, 18B, and 18C, the lower limit of the quantity of light is 0. When the turning degree θ reaches 15°, the light control can be performed in the range of necessary quantity of light for each objective lens.

Figure 19:
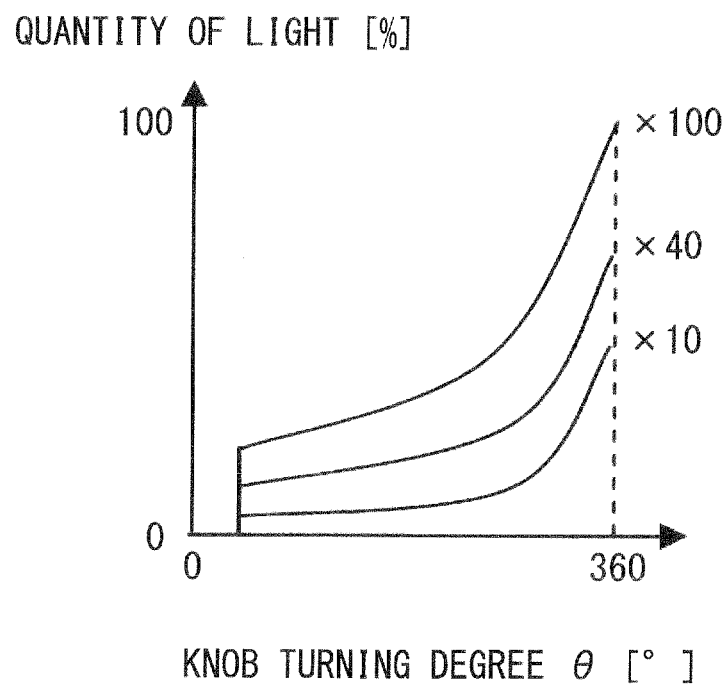
FIG. 19 illustrates the light control characteristic when there is the relationship of $I(\theta) \propto EXP(\theta)$ between the turning degree $\theta$ of a light control knob 4 and the quantity of light $I(\theta)$ in the second embodiment (variation example 2), and the lower limit and the upper limit of the output voltage depending on each of the objective lenses 15 through 17 are stored in the voltage table.

FIG. 19 illustrates the light control characteristic when there is the relationship of I(θ)∝EXP (θ) between the turning degree θ of a light control knob 4 and the quantity of light I(θ) in the third embodiment (variation example 2), and the lower limit and the upper limit of the output voltage depending on each of the objective lenses 15 through 17 are stored in the voltage table. In FIG. 17, when a 10× objective lens is selected, no threshold is set for the turning degree θ of the light control knob. On the other hand, in FIG. 13, when a 10× objective lens is service, the quantity of light is 0 for the turning degree θ of the light control knob of 0° through the threshold, and when the turning degree θ exceeds the threshold, the quantity of light increases depending on the turning degree θ.

In FIGS. 15 and 17, the ranges of light control of the objective lenses do not overlap each other. On the other hand, in FIG. 19, the ranges of light control between the objective lenses partly overlap each other. In FIG. 19, for example, at the turning degree θ=360° of the light control knob when a 40× objective lens is selected, the quantity of light is 50% or more, but if the turning degree θ is nearly 0° when a 100× objective lens is selected, the quantity of light is less than 50%. Furthermore, a coefficient of I(θ)∝EXP (θ) can be changed for each objective lens.

Thus, a lower limit and an upper limit can be set for the voltage value set in the voltage table. In addition, the rate of change in quantity of light to the turning degree θ of the light control knob can be constant by setting the voltage table so that the relationship of I(θ)∝EXP (θ) can hold between the turning degree θ of the light control knob 4 and the quantity of light I(θ). Therefore, the light control can be finely adjusted depending on the objective lens.

According to the third embodiment, any of the degrees from 0 to 360° can be used as the turning degree θ of the light control knob 4 for each objective lens. Therefore, the light control can be finely adjusted depending on the objective lens.

In addition, a lower limit and an upper limit can be set for the quantity of light that can be controlled depending on the objective lens. Thus, excess quantity of light unnecessary for an observation can be excluded, thereby quickly and easily performing the light controlling operation. Various light control characteristics can be acquired by storing a voltage table in accordance with I(θ)∝EXP (θ) in the ROM 1. Furthermore, predetermined light control sensitivity can be acquired.

<Fourth Embodiment>

Described below is the microscope system in the fourth embodiment in which when the relationship of I(θ)∝θ holds between the turning degree θ of the light control knob and the quantity of light I(θ), the light control can be finely adjusted by changing the range in which light control can be performed depending on the observation method.

The present embodiment is described below in detail. In the present embodiment, the same configuration as in the first embodiment is assigned the same reference numeral, and the description is omitted here.

Figure 20:
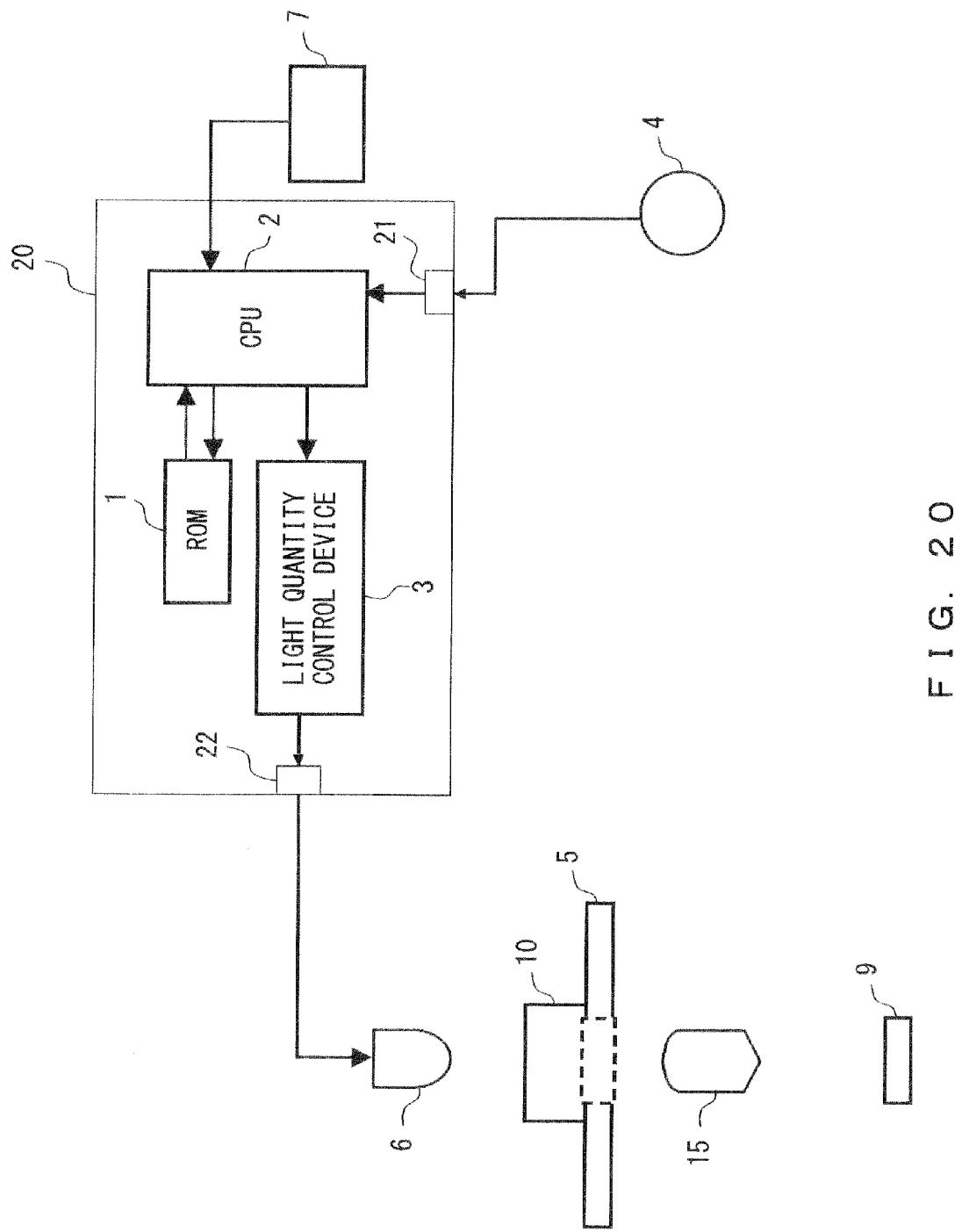
FIG. 20 is an entire configuration of the microscope system according to the fourth embodiment.

FIG. 20 is an entire configuration of the microscope system according to the fourth embodiment. The configuration illustrated in FIG. 20 is obtained by adding observation method switch 7 to the configuration illustrated in FIG. 2. The member can be added to the configuration illustrated in FIG. 3.

The observation method can be switched using the observation method switch 7. The observation method switch 7 can switch three types of observations, that is, a bright sight observation, a phase difference observation, and a dark sight observation. Each observation method requires different quantity of light.

Since an observation can be performed by taking ambient light other than illumination light in the bright sight observation, large quantity of light is not necessary. On the other hand, since an observation is performed in the state in which no ambient light is used in the dark sight observation, large quantity of light is required. Since the phase difference observation requires smaller quantity of light than the dark sight observation, the necessary quantity of light is intermediate between the bright sight and the dark sight.

The range of the quantity of light to be used depends on the observation method. Therefore, a voltage table depending on each observation method is required. Thus, the ROM 1 records each observation method. There are three types of observation methods, that is, the bright sight observation, the phase difference observation, and the dark sight observation. The voltage table for each of the observation methods is sequentially assigned to, for example, the addresses 0031h, 0032h, and 0033h of the ROM 1.

Using the observation method switch 7, the CPU 2 reads the voltage table depending on the observation method from the ROM 1, reads the voltage value from the read voltage table, and outputs the value to the light quantity control device 3. The light quantity control device 3 outputs power based on the voltage value to the white LED 6, and controls the quantity of light of the white LED 6.

Figure 21:
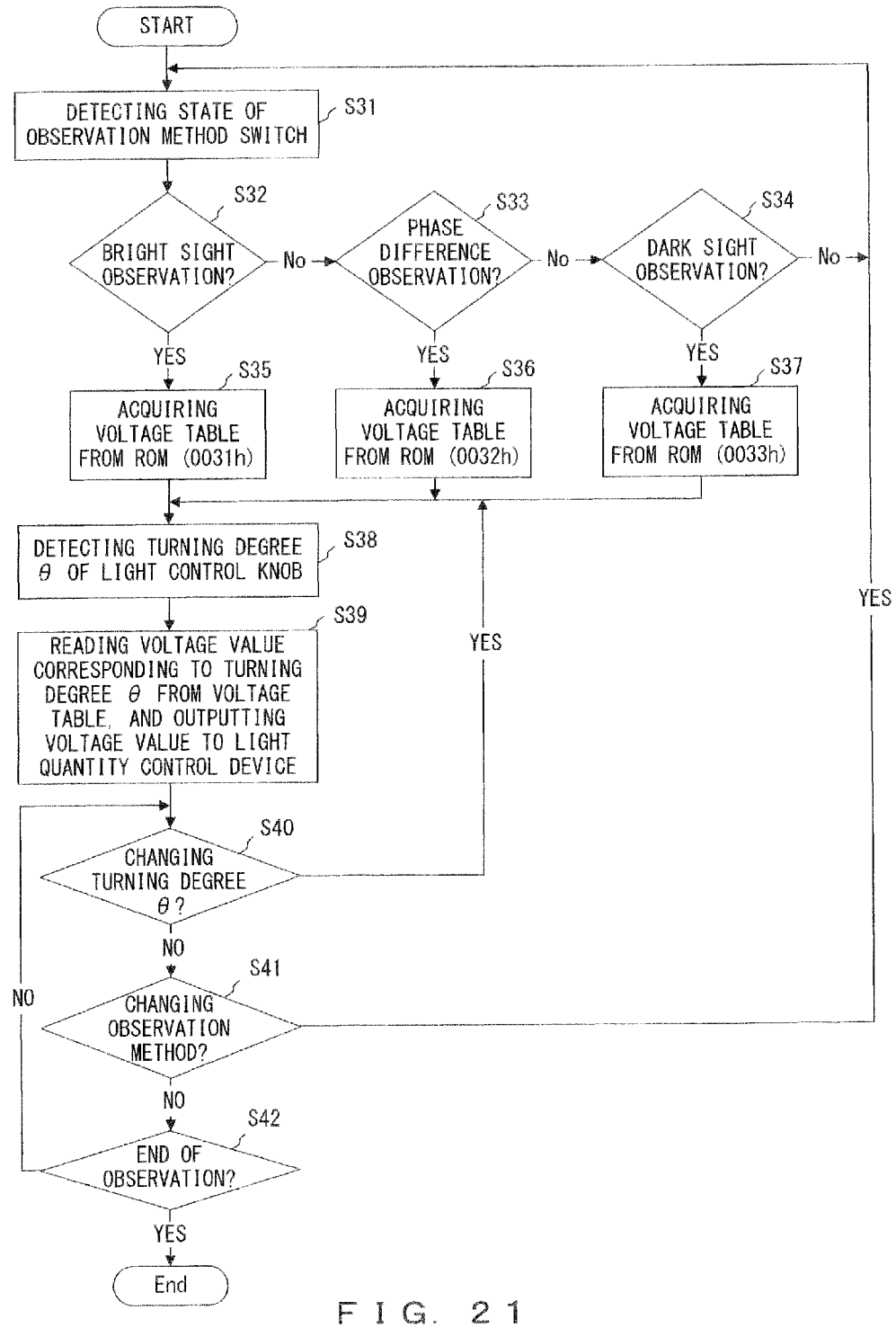
FIG. 21 is a control flow of the range of light control depending on the observation method in the fourth embodiment.

FIG. 21 is a control flow of the range of light control depending on the observation method in the fourth embodiment. The light control method is described below with reference to FIG. 21. The user switches the observation methods (bright sight observation, phase difference observation, and dark sight observation) using the observation method switch 7. Then, the change information about any of the bright sight observation, the phase difference observation, and the dark sight observation that has been switched is transmitted from the observation method switch 7 to the CPU 2.

The CPU 2 receives the change information from the observation method switch 7, and detects the state of the observation method switch 7 according to the change information (S31). According to the change information, the CPU 2 determines which has been switched to, the bright sight observation, the phase difference observation, or the dark sight observation (S32 through S34).

Then, according to the determination result, the CPU 2 reads the voltage table corresponding to the determined observation method from any of the addresses 0031h, 0032h, and 0033h of the ROM 1 (S35 through S37). If the determination cannot be performed on the observation method in S32 through S34, control is returned to S31.

When the value of the turning degree $\theta$ of the light control knob 4 is detected by the CPU 2 (S38), the CPU 2 reads the voltage value corresponding to the turning degree $\theta$ from the voltage table of the ROM 1, and outputs the voltage value to the light quantity control device 3 (S39). The light quantity control device 3 provides the white LED 6 with the power based on the voltage value.

When the light control knob 4 is turned (S40), control is returned to S38 to perform light control. When the observation method is changed (S41), control is returned to S31 and the operation can be continued using the observation method switch 7.

When he observation is continued (NO in S42), control is returned to S40. When the observation is terminated (YES in S42), the present flow terminates.

Figure 22:
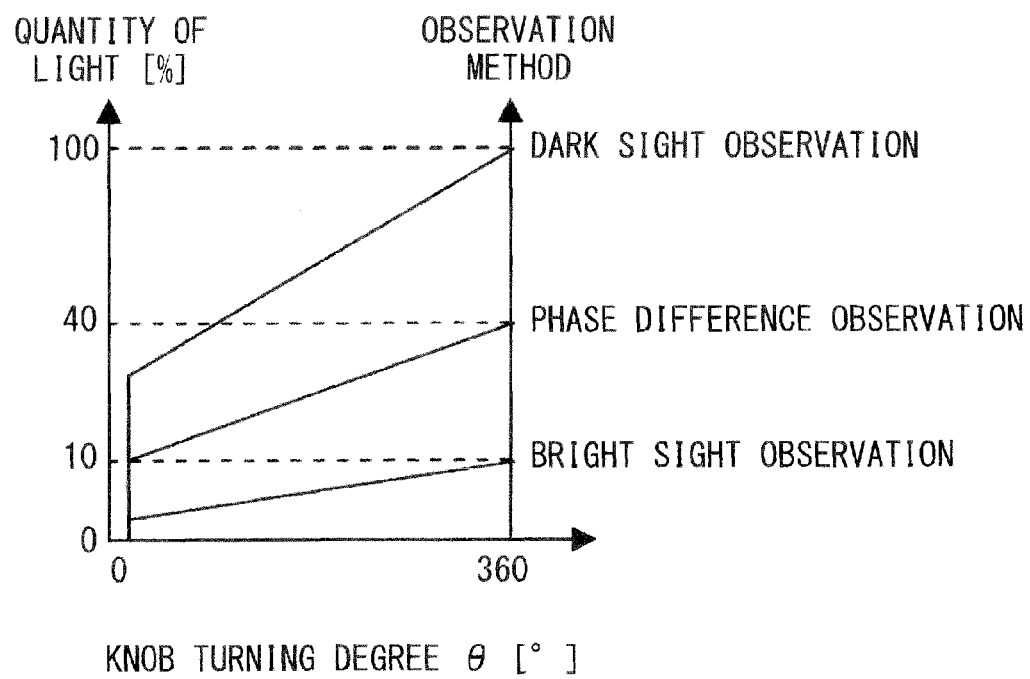
FIG. 22 illustrates the light control characteristic when there is the relationship of $I(\theta) \propto \theta$ between the turning degree $\theta$ of a light control knob 4 and the quantity of light $I(\theta)$ in the fourth embodiment (variation example), and the lower limit and the upper limit of the output voltage depending on the observation method are stored in the voltage table.

The voltage value set in the voltage table depending on each observation method can also be set so that the relationship of $I(\theta) \propto \theta$ can hold between the turning degree $\theta$ of the light control knob 4 and the quantity of light $I(\theta)$ as in graphs (A), (B), and (C) of FIG. 7. As illustrated in FIG. 22, a lower limit and an upper limit can be set for the range of light control of each observation method.

FIG. 22 illustrates the light control characteristic when there is the relationship of $I(\theta) \propto \theta$ between the turning degree $\theta$ of a light control knob 4 and the quantity of light $I(\theta)$ in the fourth embodiment (variation example), and the lower limit and the upper limit of the output voltage depending on the observation method are stored in the voltage table. With the configuration, the light control can be finely adjusted depending on the observation method. Furthermore, excess quantity of light unnecessary for an observation can be excluded, thereby quickly and easily performing the light controlling operation.

According to the fourth embodiment, any of the degrees from 0 to 360° can be used as the turning degree $\theta$ of the light control knob 4 depending on each observation method. Therefore, the light control can be finely adjusted depending on the observation method.

In addition, a lower limit and an upper limit can be set for the quantity of light that can be controlled depending on the observation method. Thus, excess quantity of light unnecessary for an observation can be excluded, thereby quickly and easily performing the light controlling operation. Various light control characteristics can be acquired by storing a voltage table in accordance with $I(\theta) \propto \theta$ in the ROM 1.

<Fifth Embodiment>

Described in the fifth embodiment is the microscope system capable of finely adjusting the light control by changing the range of the light control depending on the observation method when the relationship of $I(\theta) \propto EXP(\theta)$ holds between the turning degree $\theta$ of the light control knob and the quantity of light $I(\theta)$. The present embodiment is a variation example of the fourth embodiment, and obtained by storing the voltage table in accordance with $I(\theta) \propto EXP(\theta)$ in the ROM 1 of the fourth embodiment. In the present embodiment, the same configurations as in the first through fourth embodiments are assigned the same reference numerals, and the description is omitted here.

Figure 23:
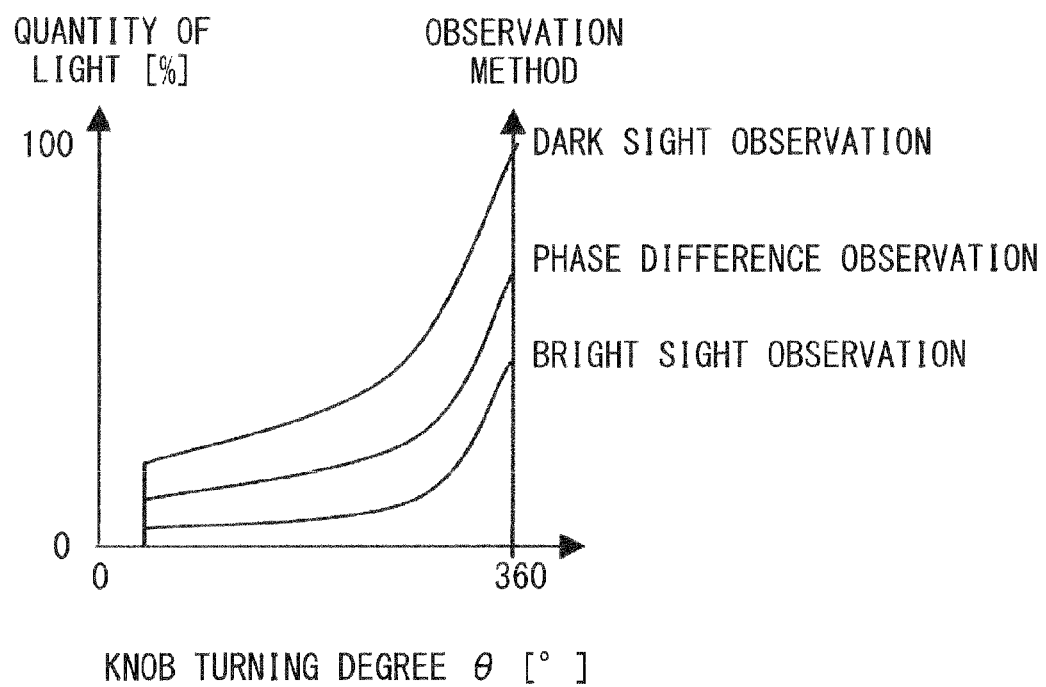
FIG. 23 illustrates the light control characteristic when there is the relationship of $I(\theta) \propto EXP(\theta)$ between the turning degree $\theta$ of a light control knob 4 and the quantity of light $I(\theta)$ in the fifth embodiment, and the lower limit and the upper limit of the output voltage depending on the observation method are stored in the voltage table.

FIG. 23 illustrates the light control characteristic when there is the relationship of $I(\theta) \propto EXP(\theta)$ between the turning degree $\theta$ of a light control knob 4 and the quantity of light $I(\theta)$ in the fifth embodiment, and the lower limit and the upper limit of the output voltage depending on the observation method are stored in the voltage table. With the configuration, the rate of change in quantity of light to the turning degree of the light control knob is constant, and the light control can be finely adjusted depending on the observation method.

According to the fifth embodiment, a lower limit and an upper limit can be set for the quantity of light that can be controlled depending on the objective lens. Thus, excess quantity of light unnecessary for an observation can be excluded, thereby quickly and easily performing the light controlling operation. Furthermore, various light control characteristics can be acquired by storing a voltage table in accordance with $I(\theta) \propto EXP(\theta)$ in the ROM 1. Especially, constant light control sensitivity can be acquired by setting $I(\theta) \propto EXP(\theta)$.

<Sixth Embodiment>

Described below is the microscope system in the sixth embodiment in which when the relationship of $I(\theta) \propto \theta$ holds between the turning degree $\theta$ of the light control knob and the quantity of light $I(\theta)$, the light control can be finely adjusted by changing the range in which light control can be performed depending on the objective lens and the observation method. The present embodiment is a combination of the second and fourth embodiments. In the present embodiment, the same configurations as in the first through fourth embodiments are assigned the same reference numerals, and the descriptions are omitted here.

Figure 24:
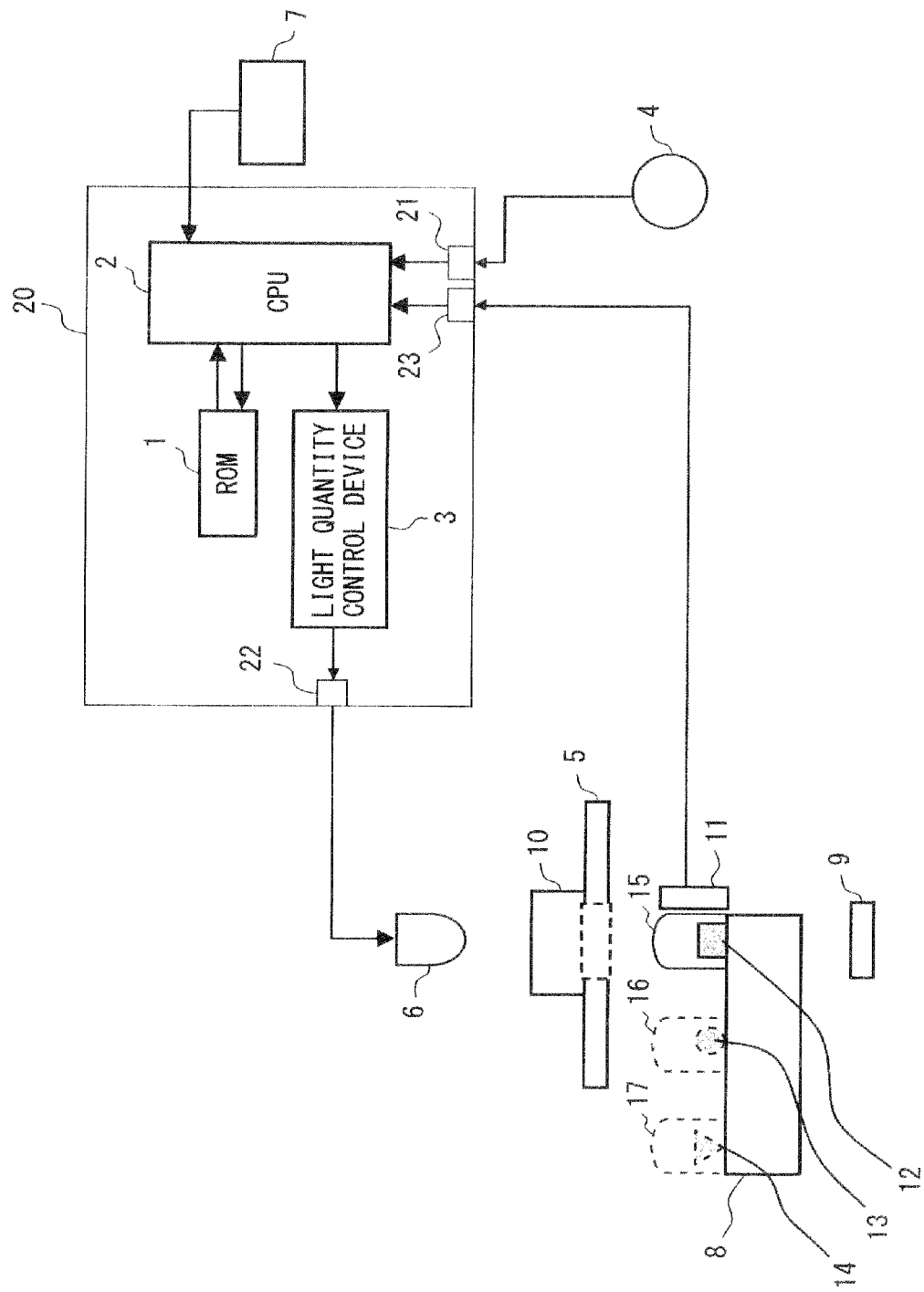
FIG. 24 is an entire configuration of the microscope system according to the sixth embodiment.

FIG. 24 is an entire configuration of the microscope system according to the sixth embodiment. The configuration illustrated in FIG. 24 is obtained by adding the observation method switch 7, the revolver 8, the sensor 11, magnets 12, 13, and 14, and the objective lenses 15, 16, and 17 to the configuration illustrated in FIG. 2.

A voltage table corresponding to each combination of the objective lens and the observation method is stored in the ROM 1. Furthermore, the ROM 1 stores objective lens information, observation method information, etc.

The CPU 2 reads the objective lens information and the observation method information from the ROM 1, and reads the voltage table corresponding to the combination from the ROM 1.

In the present embodiment, three types of objective lenses, for example, 10×, 40×, and 100× objective lenses, are used as the objective lenses 15 through 17. The information about each objective lens is assigned to the addresses 0021h, 0022h, and 0023h of the ROM 1 respectively for the 10×, 40×, and 100× objective lenses.

In addition, in the present embodiment, it is assumed that there are three types of observation methods, that is, the bright sight observation, the phase difference observation, and the dark sight observation. The information about each observation method is assigned to the addresses 0031h, 0032h, and 0033h of the ROM 1 respectively for the bright sight observation, the phase difference observation, and the dark sight observation.

A voltage table corresponding to the combination of the objective lens and the observation method is prepared. For example, if there are three types of objective lenses, that is, the 10×, 40×, and 100× objective lenses, and three types of observation methods, that is, bright sight observation, the phase difference observation, and the dark sight observation, then there are nine combinations of the objective lenses and the observation methods, and nine voltage tables are required. The ROM 1 stores the voltage tables different from one another depending on the combinations of the objective lenses and the observation methods. For example, the addresses 0041h through 0049 are assigned in the order of (the storage addresses of objective lens information, the storage addresses of observation method information)=(0021h, 0031h), (0021h, 0032h), (0021h, 0033h), (0022h, 0031h), (0022h, 0032h), (0022h, 0033h), (0023h, 0031h), (0023h, 0032h), and (0023h, 0033h).

Using the sensor 11 and the observation method switch 7, the CPU 2 reads the voltage table from the ROM 1 depending on the combination of the objective lens and the observation method, reads the voltage value from the voltage table depending on the turning degree of the light control knob 4, and outputs the voltage value to the light quantity control device 3. The light quantity control device 3 provides the white LED 6 with the power based on the voltage value.

Figure 25A:
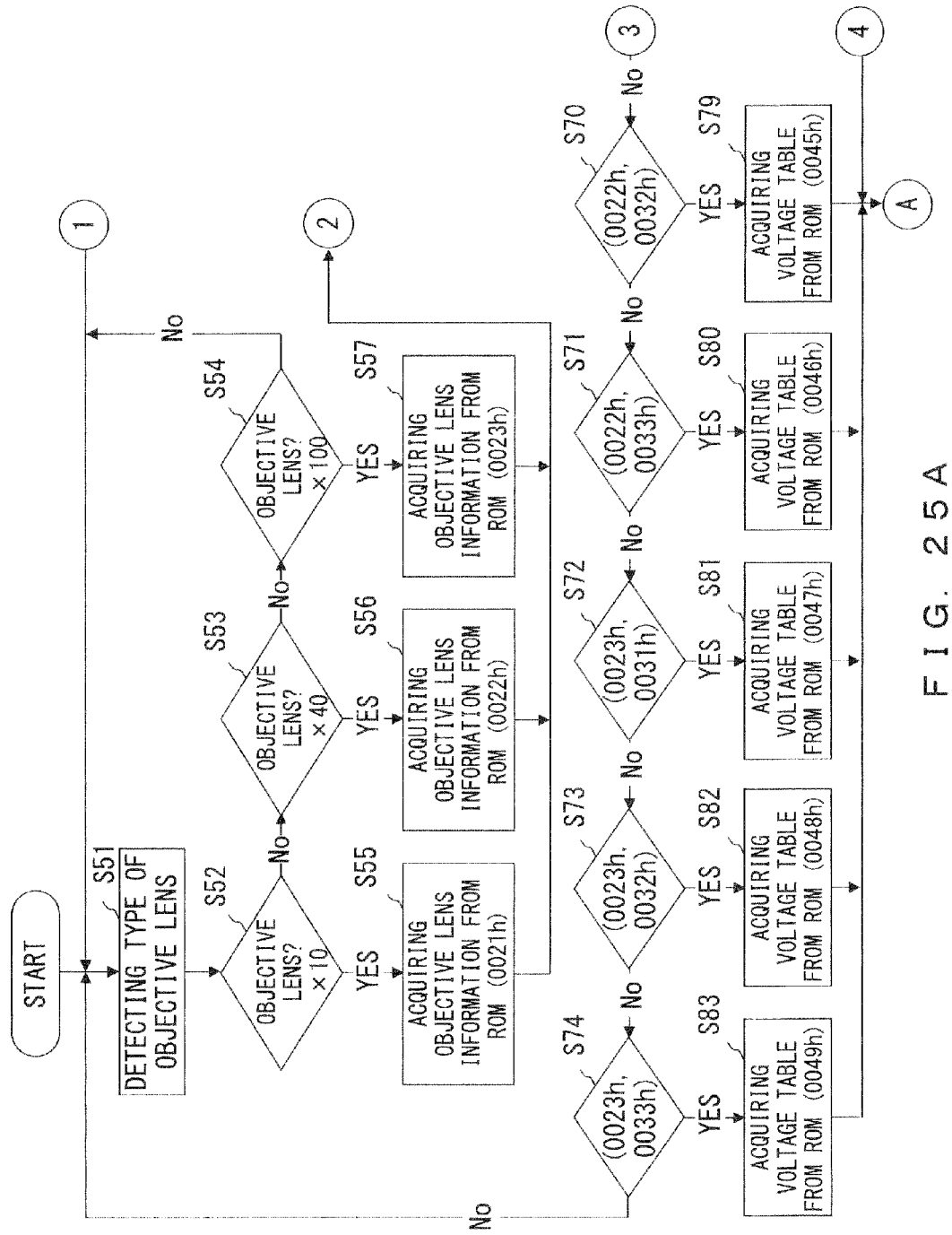
FIGS. 25A, 25B, 25C are a control flow of the range of light control depending on the objective lens and the observation method in the sixth embodiment.
Figure 25B:
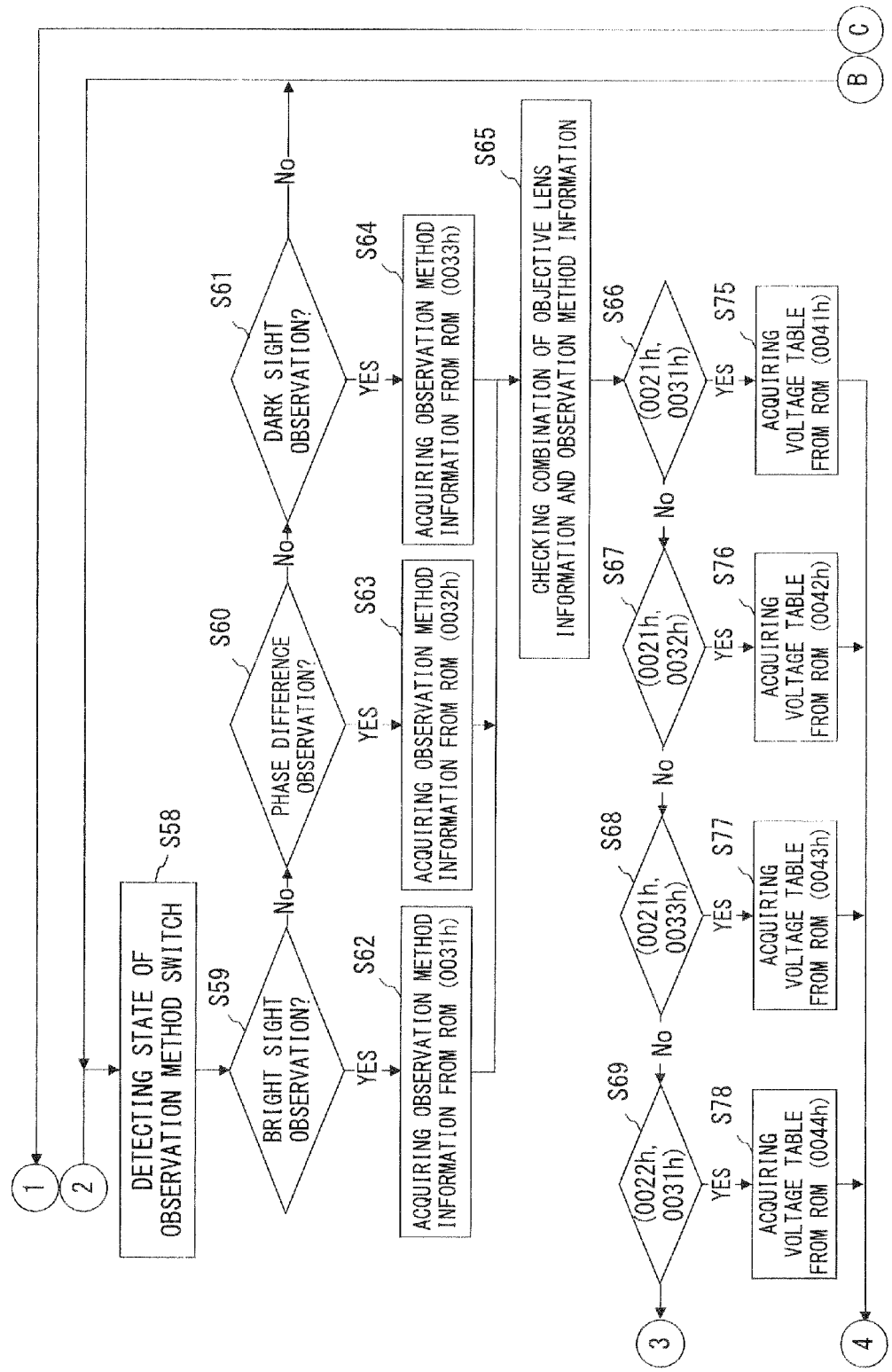
Figure 25C:
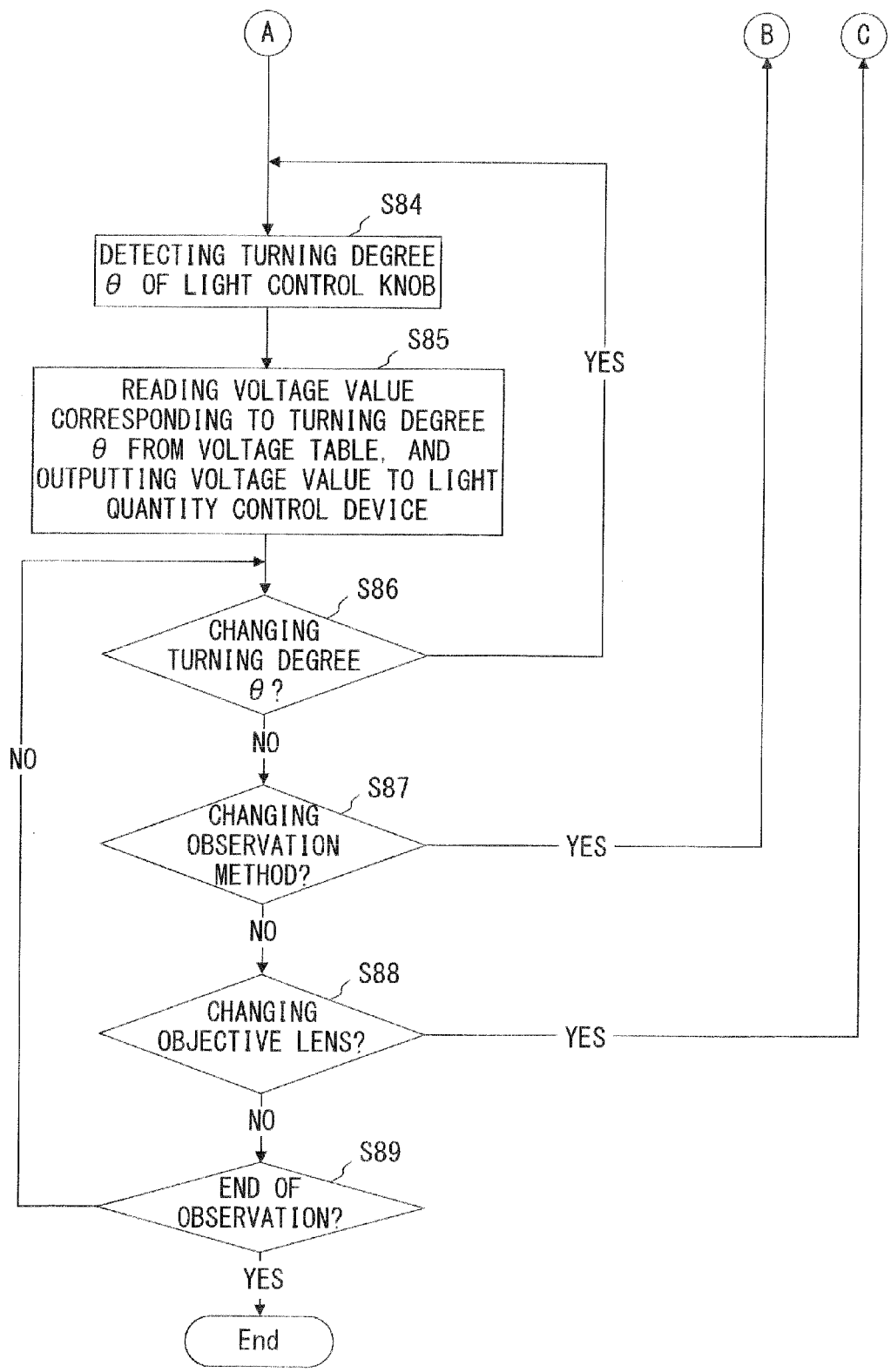

FIGS. 25A, 25B and 25C are control flows of the range of light control depending on the objective lens and the observation method in the sixth embodiment. The light control method is described below with reference to FIGS. 25A, 25B and 25C. The number of the magnets 12 through 14 loaded into the objective lenses 15 through 17 depends on the magnification of the objective lens The sensor 11 detects the number of magnets loaded into the objective lens arranged on the optical axis (S51). The sensor 11 transmits the detection result as detected information to the CPU 2. The CPU 2 receives the detected information from the sensor 11, and identifies the objective lens arranged on the optical axis (S52 through S54).

The CPU 2 reads the voltage table corresponding to the identified objective lens from the ROM 1 (S55 through S57). If the detected information from the sensor 11 cannot be acquired in S52 through S54, control is returned to S51.

Next, the user switches the observation method (bright sight observation, phase difference observation, dark sight observation) using the observation method switch 7. Then, the change information that any of the bright sight observation, the phase difference observation, and the dark sight observation has been switched is transmitted from the observation method switch 7 to the CPU 2.

The CPU 2 receives the change information from the observation method switch 7 and detects the state of the observation method switch 7 according to the change information (S58). According to the change information, the CPU 2 determines which has been switched to, the bright sight observation, the phase difference observation, or the dark sight observation (S59 through S61).

Based on the determination result, the CPU 2 reads the observation method information corresponding to the determined observation method from any of the addresses 0031h, 0032h, and 0033h of the ROM 1 (S62 through S64). If the observation method cannot be determined in S59 through S61, control is returned to S58.

The CPU 2 checks the combination of the objective lens and the observation method (S65), and determines the combination (S66 through S74). The CPU 2 reads the voltage table corresponding to the determined combination of the objective lens and the observation method from any of the addresses 0041h through 0049h of the ROM 1 (S75 through S83).

When the CPU 2 detects the value of the turning degree $\theta$ of the light control knob 4 (S84), the CPU 2 reads the voltage value corresponding to the turning degree $\theta$ from the voltage table of the ROM 1, and outputs the voltage value to the light quantity control device 3 (S85). The light quantity control device 3 provides the white LED 6 with the power according to the voltage value.

When the light control knob 4 is continuously turned (S86), control is returned to S84 to perform light control.

When the observation method switch 7 is depressed and observation method is changed (S87), control is returned to S58 to continue the operation. When the objective lens is changed (S88), control is returned to S51 to continue the operation. When the observation is continued (NO in S89), control is returned to S86. When the observation is terminated (YES in S89), the present flow is terminated.

Figure 26:
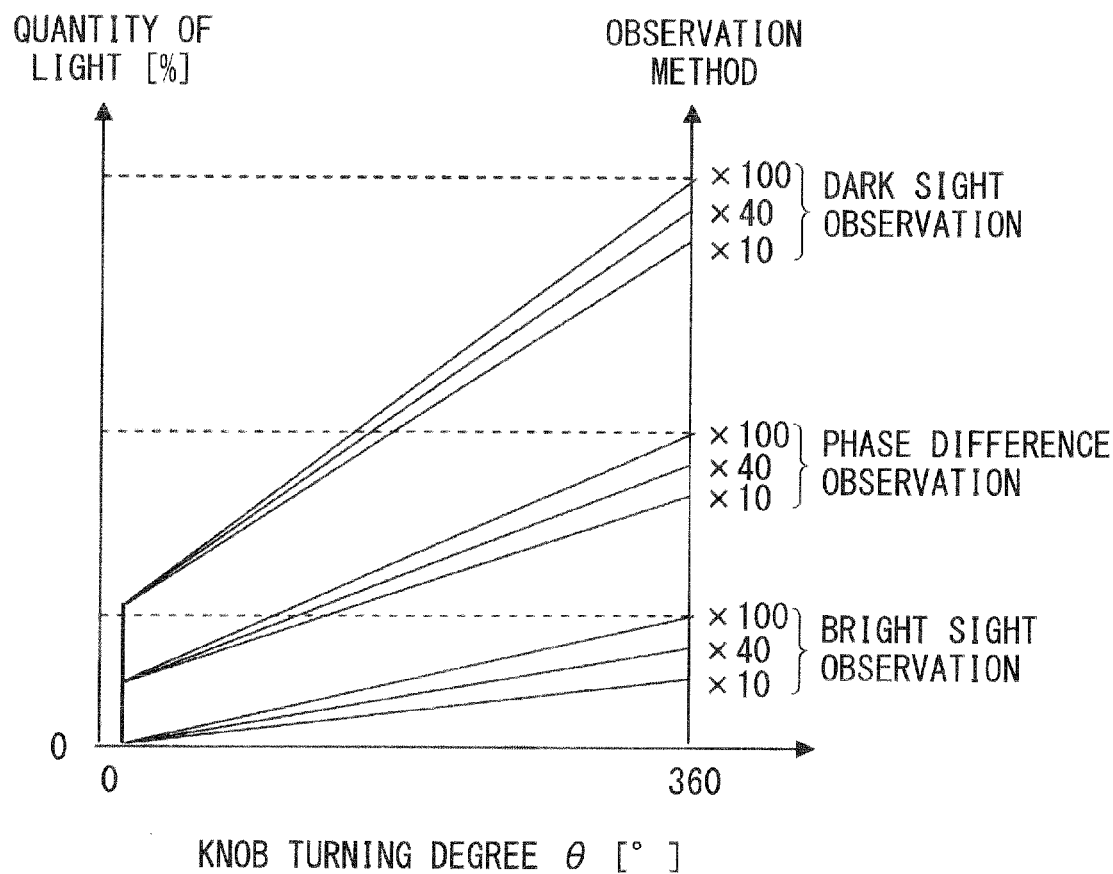
FIG. 26 illustrates the light control characteristic when there is the relationship of $I(\theta) \propto \theta$ between the turning degree $\theta$ of a light control knob 4 and the quantity of light $I(\theta)$ in the sixth embodiment, and the lower limit and the upper limit of the output voltage depending on the objective lens and the observation method are stored in the voltage table.

The voltage table stored in the ROM 1 when there is the following relationship between the turning degree $\theta$ of the light control knob 4 and the quantity of light $I(\theta)$ is illustrated in FIG. 26.

FIG. 26 illustrates the light control characteristic when there is the relationship of $I(\theta) \propto \theta$ between the turning degree $\theta$ of a light control knob 4 and the quantity of light $I(\theta)$ in the sixth embodiment, and the lower limit and the upper limit of the output voltage depending on the objective lens and the observation method are stored in the voltage table. With the configuration, the light control can be finely adjusted depending on the objective lens and the observation method.

According to the sixth embodiment, the light control performance can be furthermore improved than in the second or fourth embodiment depending on the combination of an objective lens and an observation method.

<Seventh Embodiment>

Described below is the microscope system in the seventh embodiment in which when the relationship of $I(\theta) \propto EXP(\theta)$ holds between the turning degree $\theta$ of the light control knob and the quantity of light $I(\theta)$, the light control can be finely adjusted by changing the range in which light control can be performed depending on the objective lens and the observation method. The present embodiment is a combination of the third and fifth embodiments, and a variation example of the sixth embodiment. In the sixth embodiment, the ROM 1 stores the voltage table in accordance with $I(\theta) \propto EXP(\theta)$. In the present embodiment, the same configurations as the first through fourth embodiments are assigned the same reference numerals, and the descriptions are omitted here.

Figure 27:
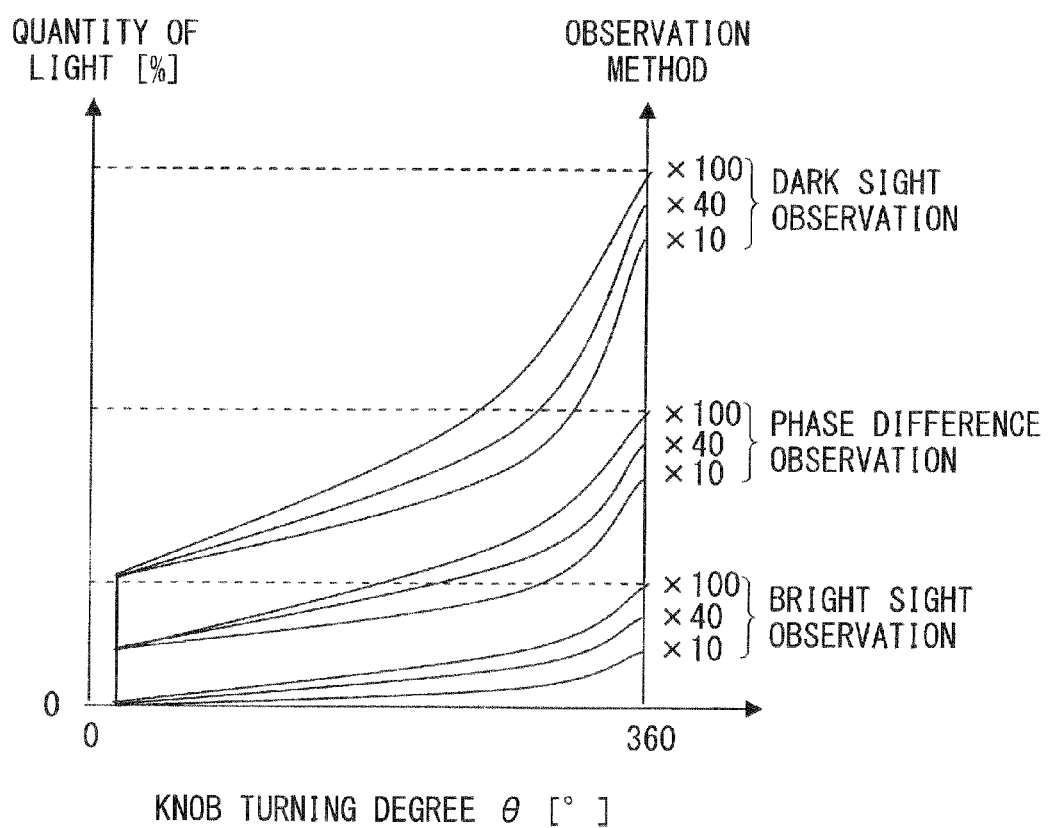
FIG. 27 illustrates the light control characteristic when there is the relationship of $I(\theta) \propto EXP(\theta)$ between the turning degree $\theta$ of a light control knob 4 and the quantity of light $I(\theta)$ in the seventh embodiment, and the lower limit and the upper limit of the output voltage depending on the objective lens and the observation method are stored in the voltage table.

FIG. 27 illustrates the light control characteristic when there is the relationship of $I(\theta) \propto EXP(\theta)$ between the turning degree $\theta$ of a light control knob 4 and the quantity of light $I(\theta)$ in the seventh embodiment, and the lower limit and the upper limit of the output voltage depending on the objective lens and the observation method are stored in the voltage table. With the configuration, the rate of change in quantity of light to the turning degree of the light control knob is constant and the light control can be finely adjusted depending on the objective lens and the observation method.

According to the seventh embodiment, the light control performance can be furthermore improved than in the third or fifth embodiment depending on the combination of an objective lens and an observation method.

According to the first through seventh embodiments, the entire range of the light control knob can be used although any objective lens, observation method, or combination of them is selected, thereby finely adjusting the light control. This can be realized by setting the turning degree $\theta$ of the light control knob 4 in the voltage table and the voltage value corresponding to the turning degree $\theta$ so that the relationship of $I(\theta) \propto \theta$ or $I(\theta) \propto EXP(\theta)$ can hold between the turning degree $\theta$ of the light control knob 4 and the quantity of light $I(\theta)$.

In the above-mentioned embodiments, a voltage table is required depending on the objective lens or the observation method, but the present invention is not limited to this application, but the voltage table can be prepared depending on the component of switching other observation conditions.

In addition, according to the embodiments above, the relationship of $I(\theta) \propto \theta$ or $I(\theta) \propto EXP(\theta)$ holds between the turning degree $\theta$ of the light control knob 4 and the quantity of light $I(\theta)$, but the present invention is not limited to this application, and other relationships of n-th order function.

Furthermore, according to the above-mentioned embodiments, the lower limit and the upper limit of the quantity of light that can be controlled depending on the objective lens can be set. Thus, excess quantity of light unnecessary for an observation can be excluded, thereby quickly and easily performing the light controlling operation.

The present invention is not limited to the above-mentioned embodiments, but various configurations and embodiments can be realized within the gist of the present invention.

According to the present invention, an adjustment can be easily made for the optimum light control sensitivity under any observation condition in a microscope observation.

What is claimed is:

1. A microscope system, comprising:
a microscope for observing a sample;
an illumination unit which illuminates the sample;
a light control direction unit which specifies a quantity of light I output from the illumination unit, wherein the light control direction unit is capable of rotating a rotating scale and outputting a turning degree $\theta$ of the rotating scale as directive information indicating the quantity of light to be output from the illumination unit;
an observation method switch unit for switching a currently set observation method of the microscope between a plurality of observation methods;
a storage unit which stores voltage-related information in which turning degrees $\theta$ which are specifiable by the light control direction unit and voltage values to be applied to the illumination unit are respectively associated with each other, wherein the voltage-related information is defined for each observation method, and the turning degrees $\theta$ which are specifiable by the light control direction unit are in an entire range of the rotating scale in each observation method;
a light quantity control unit which controls the quantity of light I emitted from the illumination unit; and
a control unit which acquires the voltage value corresponding to the turning degree $\theta$ specified by the light control direction unit from the voltage-related information corresponding to the currently set observation method,
wherein the control unit allows the light quantity control unit to control the quantity of light I emitted from the illumination unit based on the acquired voltage value so that the quantity of light I will be 0 until the specified turning degree $\theta$ exceeds a threshold set according to the currently set observation method, and so that a relationship between the turning degree $\theta$ and the quantity of light I of the illumination unit will be $I(\theta) \propto \theta$ or $I(\theta) \propto EXP(\theta)$ when the specified turning degree $\theta$ exceeds the threshold.

2. The system according to claim 1, wherein the light quantity control unit controls the quantity of light I of illumination light by changing an energizing pulse width to the illumination unit.

3. The system according to claim 1, wherein the illumination unit comprises a solid semiconductor element.

4. An illumination control device used in a microscope system for controlling light of an illumination light source, the microscope system comprising (i) a microscope for observing a sample; (ii) an illumination light source which illuminates the sample; (iii) a light control direction unit which specifies a quantity of light I to be output from the illumination light source, the light control direction unit being capable of rotating a rotating scale and outputting a direction signal which indicates a turning degree $\theta$ of the rotating scale indicating the quantity of light to be output from the illumination light source; and (iv) an observation method switch unit for switching a currently set observation method of the microscope between a plurality of observation methods, the control device comprising:
a direction signal acquisition unit which acquires a direction signal indicating a turning degree $\theta$ of the rotating scale output from the light control direction unit which specifies the quantity of light I to be output from the illumination light source;
a storage unit which stores voltage-related information in which turning degrees $\theta$ which are specifiable by the light control direction unit and voltage values to be applied to the illumination unit are respectively associated with each other, wherein the voltage-related information is defined for each observation method of the microscope, and wherein the turning degrees $\theta$ which are specifiable by the light control direction unit are in an entire range of the rotating scale in each observation method;
a light quantity control unit which controls the quantity of light I emitted from the illumination light source; and
a control unit which acquires the voltage value corresponding to the turning degree $\theta$ specified by the light control direction unit from the voltage-related information corresponding to the currently set observation method,
wherein the control unit allows the light quantity control unit to control the quantity of light I emitted from the illumination light source based on the acquired voltage value so that the quantity of light I will be 0 until the specified turning degree $\theta$ exceeds a threshold set according to the currently set observation method, and so that a relationship between the turning degree $\theta$ and the quantity of light I of the illumination light source will be $I(\theta) \propto \theta$ or $I(\theta) \propto EXP(\theta)$ when the specified turning degree $\theta$ exceeds the threshold.

5. A method for controlling a microscope system which comprises (i) a microscope for observing a sample; (ii) an illumination light source which illuminates the sample; (iii) a light control direction unit which specifies a quantity of light I to be output from the illumination light source, the light control direction unit being capable of rotating a rotating scale and outputting a turning degree $\theta$ of the rotating scale indicating the quantity of light to be output from the illumination light source; (iv) an observation method switch unit for switching a currently set observation method of the microscope between a plurality of observation methods; and (v) a voltage-related information storage unit which stores voltage-related information in which turning degrees $\theta$ which are specifiable by the light control direction unit and voltage values to be applied to the illumination light source are respectively associated with each other, the voltage-related information being defined for each observation method, the turning degrees $\theta$ which are specifiable by the light control direction unit being in an entire range of the rotating scale in each observation method, the method comprising:

specifying, with the light control direction unit, a quantity of light to be output from the illumination light source, by specifying, with the light control direction unit, a turning degree $\theta$ of the rotating scale;

acquiring a voltage value corresponding to the turning degree $\theta$ specified by the light control direction unit from the voltage-related information corresponding to the currently set observation method; and controlling the quantity of light I emitted from the illumination light source based on the acquired voltage value so that the quantity of light I will be 0 until the specified turning degree $\theta$ exceeds a threshold set according to the currently set observation method, and so that a relationship between the turning degree $\theta$ and the quantity of light I of the illumination light source will be $I(\theta) \propto \theta$ or $I(\theta) \propto EXP(\theta)$ when the specified turning degree $\theta$ exceeds the threshold.

* * * * *